United States Patent
Kotani et al.

(10) Patent No.: US 10,336,197 B2
(45) Date of Patent: Jul. 2, 2019

(54) POWER TRANSMITTER, POWER RECEIVER, AND WIRELESS CHARGING SYSTEM

(71) Applicant: DAIHEN Corporation, Osaka-shi, Osaka (JP)

(72) Inventors: Hiroyuki Kotani, Osaka (JP); Masao Yokota, Osaka (JP)

(73) Assignee: DAIHEN Corporation, Osaka (JP)

( * ) Notice: Subject to any disclaimer, the term of this patent is extended or adjusted under 35 U.S.C. 154(b) by 289 days.

(21) Appl. No.: 15/584,373

(22) Filed: May 2, 2017

(65) Prior Publication Data
US 2017/0326996 A1 Nov. 16, 2017

(30) Foreign Application Priority Data
May 12, 2016 (JP) .................................. 2016-096261

(51) Int. Cl.
*H02J 50/10* (2016.01)
*B60L 1/00* (2006.01)
(Continued)

(52) U.S. Cl.
CPC ........... *B60L 11/1809* (2013.01); *B60L 5/005* (2013.01); *B60L 9/00* (2013.01); *B60L 53/00* (2019.02);
(Continued)

(58) Field of Classification Search
CPC .... B60L 11/18; B60L 1/00; B60L 9/00; H02J 5/00; H02J 50/12; H02J 17/00; H02J 7/06;
(Continued)

(56) References Cited

U.S. PATENT DOCUMENTS

2009/0292167 A1* 11/2009 Kimoto .............. A61B 1/00016
600/109
2011/0259694 A1* 10/2011 Matsumura .............. B60K 1/04
191/10
(Continued)

FOREIGN PATENT DOCUMENTS

EP 2 587 684 A1 5/2013
EP 2 827 472 A1 1/2015
(Continued)

OTHER PUBLICATIONS

Search Report issued in corresponding European Patent application 17169065.4, dated Sep. 22, 2017 (5 pages).

*Primary Examiner* — Yuri Kan
(74) *Attorney, Agent, or Firm* — Hamre, Schumann, Mueller & Larson, P.C.

(57) ABSTRACT

A power transmitter provided according to one aspect of the present disclosure includes a high-frequency power source device, a power transmitting unit, and a transmitter-side controller. The high-frequency power source device generates high-frequency power. The power transmitting unit includes a power-transmitting coil. The power transmitting unit wirelessly transmits the high-frequency power received from the high-frequency power source device to a power receiver mounted on an electric vehicle. The transmitter-side controller calculates a transmitter usage rate. The transmitter-side controller causes the power transmitting unit to stop power transmission in response to the transmitter usage rate exceeding a predetermined threshold. The transmitter usage rate indicates a rate of time during which the power transmitting unit transmits power to the power receiver per unit time.

10 Claims, 14 Drawing Sheets

(51) Int. Cl.
- *B60L 11/18* (2006.01)
- *H02J 50/80* (2016.01)
- *H02J 50/40* (2016.01)
- *B60L 5/00* (2006.01)
- *H02J 7/02* (2016.01)
- *H02J 7/04* (2006.01)
- *B61B 13/00* (2006.01)
- *B60L 9/00* (2019.01)
- *H02J 50/12* (2016.01)
- *B60L 53/00* (2019.01)

(52) U.S. Cl.
CPC .............. *B61B 13/00* (2013.01); *H02J 7/025* (2013.01); *H02J 7/04* (2013.01); *H02J 50/12* (2016.02); *H02J 50/40* (2016.02); *H02J 50/80* (2016.02); *Y02T 10/7005* (2013.01); *Y02T 10/7072* (2013.01); *Y02T 10/7094* (2013.01); *Y02T 90/14* (2013.01)

(58) Field of Classification Search
CPC .... H02J 7/02; H02J 50/10; B60R 1/00; H03F 3/191; H01F 38/14; A61B 1/04; H04B 5/00
See application file for complete search history.

(56) References Cited

U.S. PATENT DOCUMENTS

| | | | |
|---|---|---|---|
| 2012/0038220 A1* | 2/2012 | Kim | H02J 7/025 307/104 |
| 2012/0200151 A1* | 8/2012 | Obayashi | H02J 17/00 307/9.1 |
| 2012/0293009 A1* | 11/2012 | Kim | H02H 7/1252 307/104 |
| 2013/0026848 A1* | 1/2013 | Ito | B60L 11/182 307/104 |
| 2013/0278212 A1* | 10/2013 | Kai | H01M 10/44 320/108 |
| 2013/0285464 A1* | 10/2013 | Miwa | H04B 5/0037 307/104 |
| 2013/0285606 A1* | 10/2013 | Ben-Shalom | H01F 38/14 320/108 |
| 2013/0320759 A1* | 12/2013 | Abe | H01F 38/14 307/10.1 |
| 2014/0092243 A1* | 4/2014 | Ichikawa | B60L 7/14 348/143 |
| 2014/0097671 A1* | 4/2014 | Nakamura | B60L 3/04 307/9.1 |
| 2014/0159501 A1* | 6/2014 | Kanno | H01F 38/14 307/104 |
| 2015/0303703 A1* | 10/2015 | Hayashi | H02J 5/005 307/104 |
| 2016/0254707 A1* | 9/2016 | Fujiwara | H02J 50/12 307/104 |
| 2016/0332575 A1* | 11/2016 | Fukushima | H02J 7/025 |
| 2016/0336759 A1* | 11/2016 | Yamamoto | H02J 50/60 |
| 2016/0336760 A1* | 11/2016 | Yamamoto | H02J 50/10 |
| 2017/0070082 A1* | 3/2017 | Zheng | H02M 3/156 |
| 2017/0207657 A1* | 7/2017 | Kotani | H02J 50/40 |

FOREIGN PATENT DOCUMENTS

| | | |
|---|---|---|
| JP | 2005-261172 A | 9/2005 |
| JP | 2009-225491 A | 10/2009 |

* cited by examiner

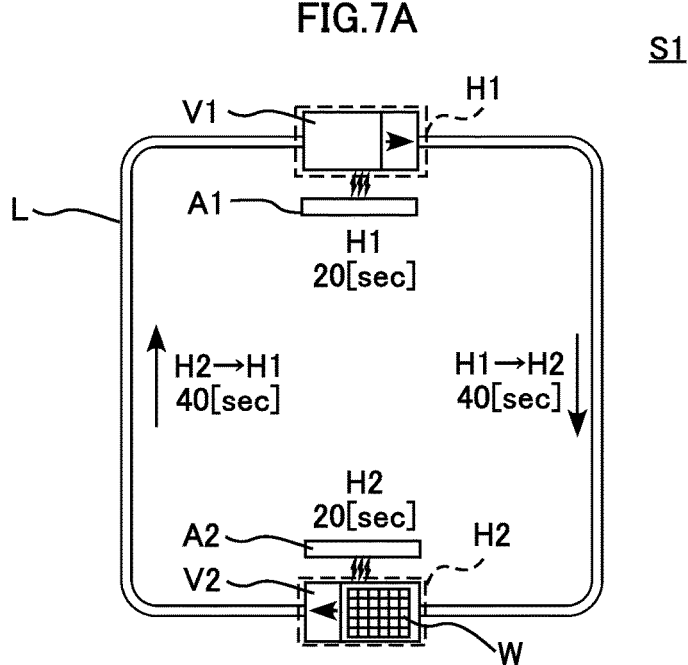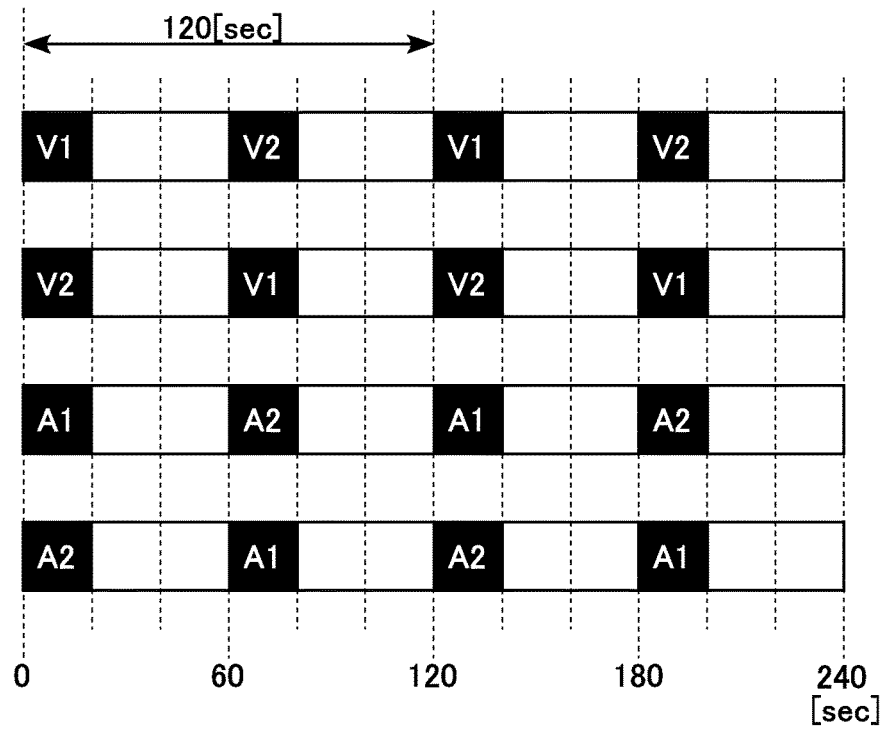

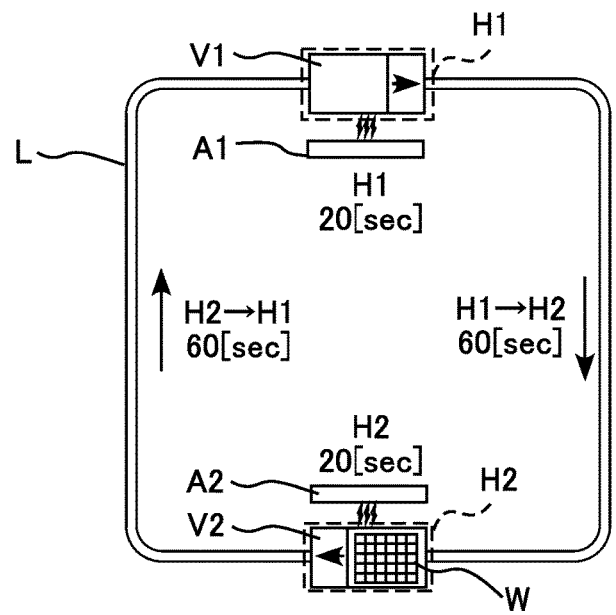
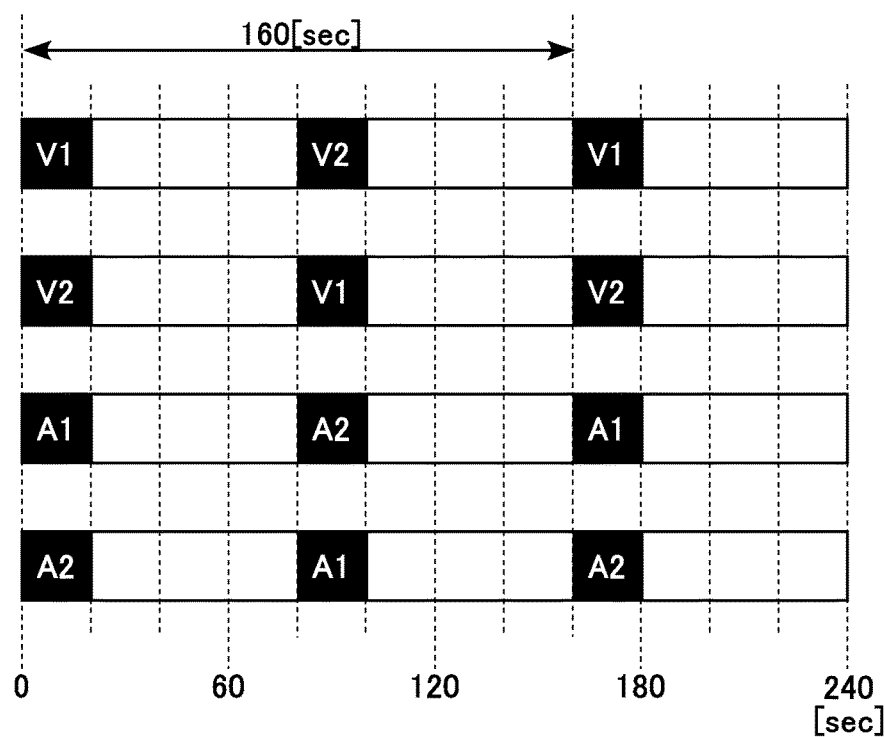

Transmitter A1

Transmitter A2

AGV V1

AGV V2

AGV V3

AGV V4

Transmitter A1

Transmitter A2

AGV V1

AGV V2

AGV V3

AGV V4

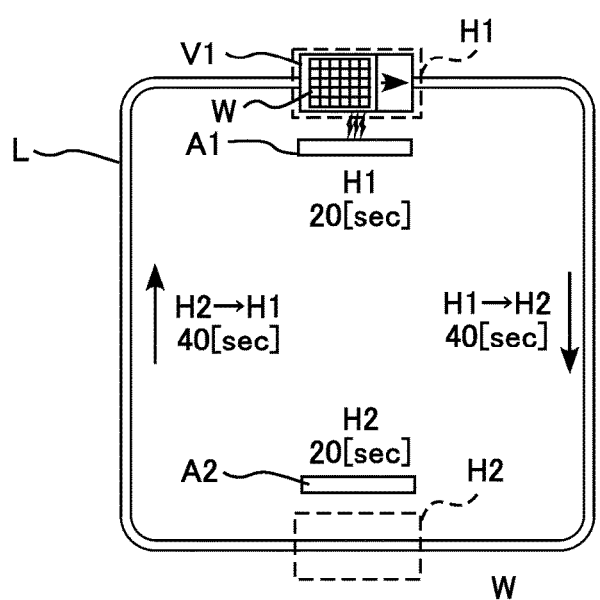
FIG. 11A
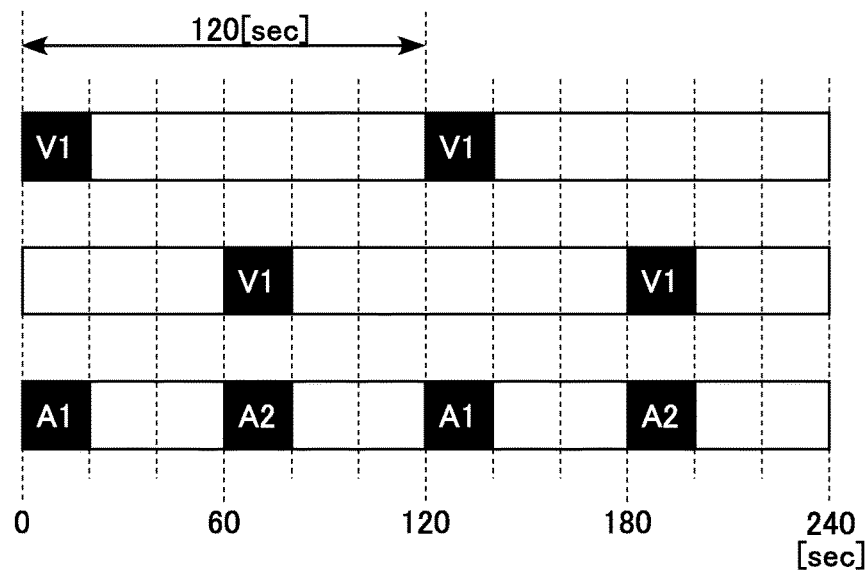
FIG. 11B
Transmitter A1
FIG. 11C
Transmitter A2
FIG. 11D
AGV V1

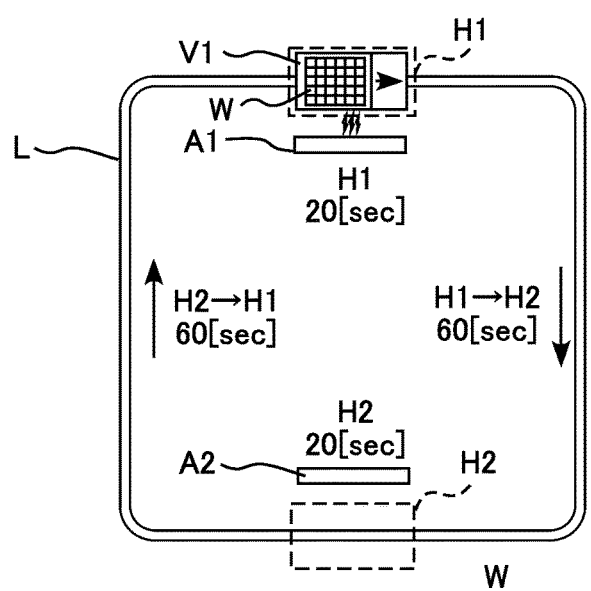
FIG.12A
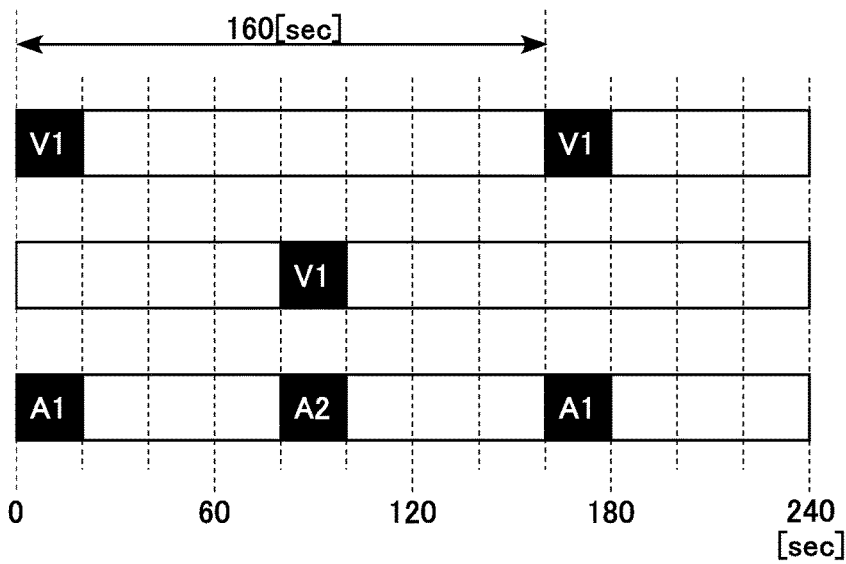
FIG.12B Transmitter A1
FIG.12C Transmitter A2
FIG.12D AGV V1

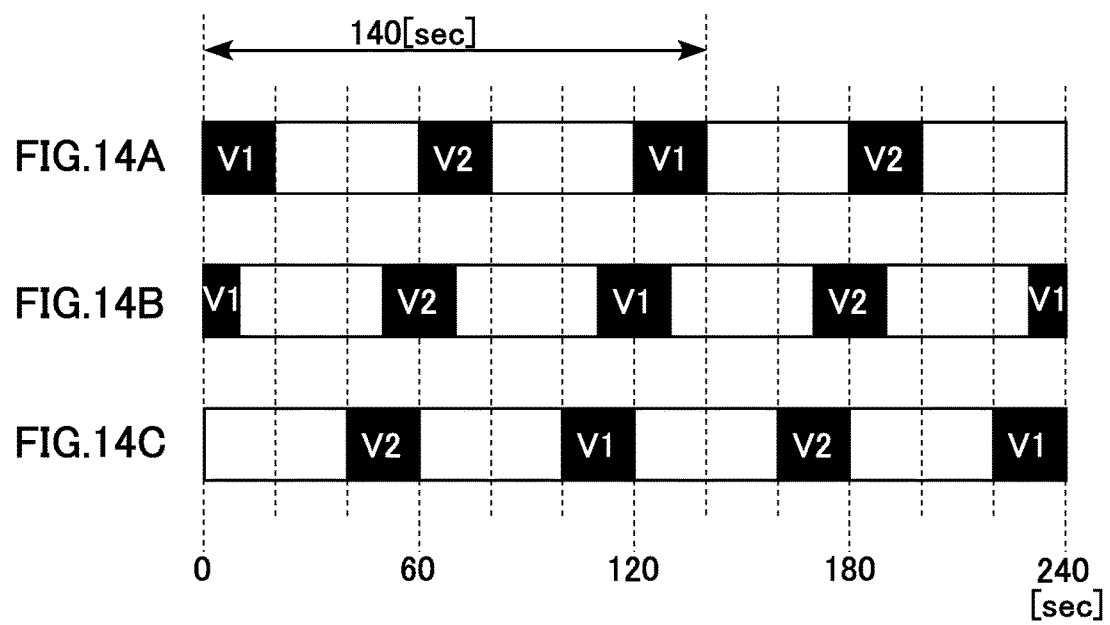

POWER TRANSMITTER, POWER RECEIVER, AND WIRELESS CHARGING SYSTEM

FIELD

The present disclosure relates to a power receiver and a power transmitter. The present disclosure also relates a wireless charging system that includes the power transmitter and the power receiver.

BACKGROUND

Unmanned automated guided vehicles (AGVs) that automatically travel along a predetermined circulation route have been employed in an AGV system for transporting materials, products and so on (hereinafter "objects") within a factory or warehouse, for example. A related technology provides an AGV system in which charging devices are installed at locations for loading or unloading of objects and charge an AGV that is parked for loading or unloading of objects. Such a system eliminates the need to charge an AGV for a long time since the AGV is charged, while it is parked, with sufficient electric power for the AGV to travel from the current stop position to the next stop position. This feature of the AGV system allows the charging devices and AGVs to be produced by using smaller or lower-performance components than those typically used (such as large-capacity secondary batteries and capacitors, large-sized cooling elements and semiconductor devices, thick power cables, and large-current printed boards). Using such components is advantageous for reducing the size, weight, and cost of the charging devices and AGVs.

Another related technology is developed for transmission of electric power from a source to a load, without a direct physical connection between them. This technology, commonly called contactless power transmission (or wireless power transmission) or wireless power supply, is applicable for charging AGVs.

Unfortunately, smaller and lower-performance components tend to be less resistant to electric current, voltage, and heat, as compared with larger or higher-performance components. Thus, using power transmitters and power receivers (AGVs) beyond the designed limit may cause a damage or failure to their components, which may render it impossible to transmit or receive electric power in worst case.

SUMMARY

A power transmitter provided according to one aspect of the present disclosure includes a high-frequency power source device, a power transmitting unit, and a transmitter-side controller. The high-frequency power source device generates high-frequency power. The power transmitting unit includes a power-transmitting coil. The power transmitting unit wirelessly transmits the high-frequency power received from the high-frequency power source device to a power receiver mounted on an electric vehicle. The transmitter-side controller calculates a transmitter usage rate. The transmitter-side controller causes the power transmitting unit to stop power transmission in response to the transmitter usage rate exceeding a predetermined threshold. The transmitter usage rate indicates a rate of time during which the power transmitting unit transmits power to the power receiver per unit time.

DRAWINGS

FIG. 7A is a view showing an AGV system of example 1 for describing thresholds of a transmitter usage rate and a receiver usage rate.

FIGS. 7B to 7E show a chart for describing thresholds of a transmitter usage rate and a receiver usage rate of the AGV system of example 1.

FIG. 8A is a view showing an AGV system of example 2 for describing thresholds of a transmitter usage rate and a receiver usage rate.

FIGS. 8B to 8E show a chart for describing thresholds of a transmitter usage rate and a receiver usage rate of the AGV system of example 2.

FIG. 11A is a view showing an AGV system of example 5 for describing thresholds of a transmitter usage rate and a receiver usage rate.

FIGS. 11B to 11D show a chart for describing thresholds of a transmitter usage rate and a receiver usage rate of the AGV system of example 5.

FIG. 12A is a view showing an AGV system of example 6 for describing thresholds of a transmitter usage rate and a receiver usage rate.

FIGS. 12B to 12D show a chart for describing thresholds of a transmitter usage rate and a receiver usage rate of the AGV system of example 6.

FIGS. 14A to 14C show a chart for describing thresholds of a transmitter usage rate and a receiver usage rate of a variation.

DETAILED DESCRIPTION

Embodiments of the present disclosure are described below with reference to the drawings. The following description is directed to an example in which a wireless charging system is applied to an AGV system that transports objects in a plant or warehouse.

Figure 1A:
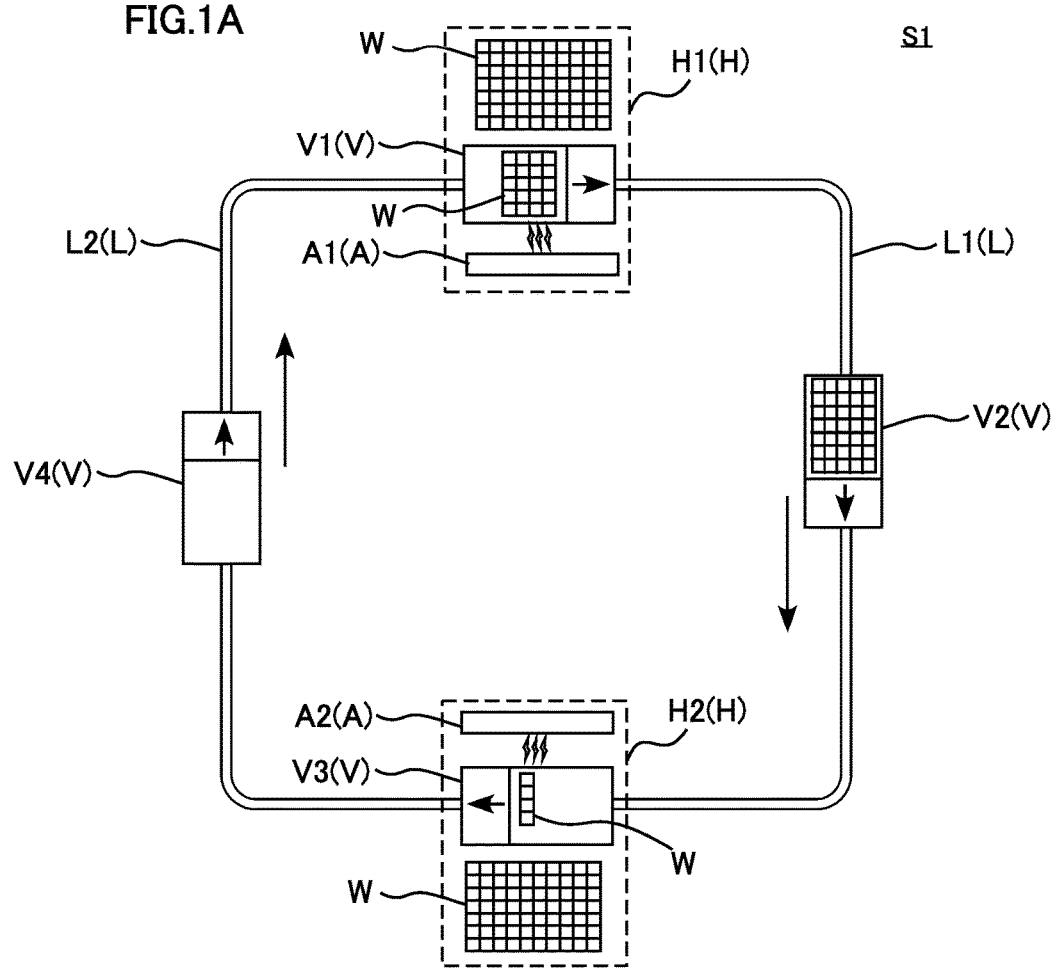
FIG. 1A is a schematic plan view showing the overall structure of an AGV system according to the present disclosure.
Figure 1B:
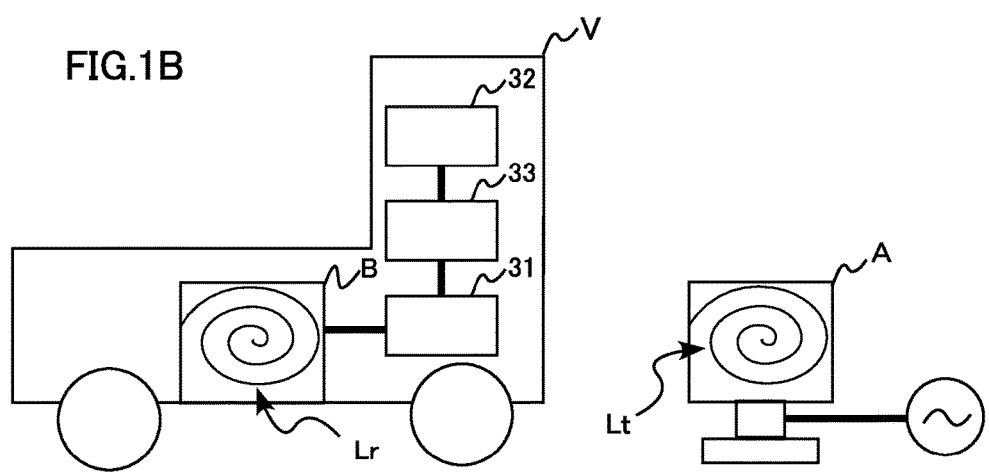
FIG. 1B is a schematic view showing the structure of an AGV and a power transmitter.

FIGS. 1A and 1B are views for describing an overview of an AGV system S1 according to a first embodiment. More specifically, FIG. 1A is schematic plan view showing the overall structure of the AGV system S1, whereas FIG. 1B is a schematic view showing the structure of an AGV V and a power transmitter A.

The AGV system S1 may include one or more power transmitters A, one or more AGVs V, and one or more circulation routes L. In the example shown in FIGS. 1A and 1B, the AGV system S1 includes two power transmitters A1 and A2, four AGVs V1 to V4, and one circulation route L. Note, however, that neither the number of power transmitters A nor the AGVs V is not specifically limited.

Each AGV V travels automatically along the predetermined circulation route L and stops at one or more predetermined stop positions H on the circulation route L. In the example shown in FIG. 1A, two stop positions H1 and H2 are determined in advance: H1 for loading of objects W and H2 for unloading. Loading and unloading of objects W may be performed manually by an operator or by using a conveyor or a robot. In addition, other objects W may be loaded at the stop position H2 and unloaded at the stop position H1. While the example shown in the figures include two stop positions H, the number of the stop positions is not specifically limited. In addition, an AGV V may stop at a stop position for on-board processing of objects W without loading or unloading, or an AGV may stop only for standby.

The stopping time Ts for which an AGV V is stopped at each stop position H for loading or unloading of objects W is set in advance. Thus, the length of the stopping time Ts is appropriately determined based on, for example, the time needed for loading or unloading of objects W.

In the AGV system S1, the four AGVs V travel along the circulation route L clockwise in plan view. In FIG. 1A, the AGV V1 stopped at the stop position H1 is being loaded with objects W. The AGV V2 is traveling on a route L1 from the stop position H1 to the stop position H2 for transporting the objects W to the stop position H2. The AGV V3 is stopped at the stop position H2, and objects W are being unloaded from the AGV V3. The AGV V4 is traveling on a route L2 from the stop position H2 to the stop position H1. In the AGV system S1 shown in FIG. 1A, an AGV V repeats four processes: the process of stopping at the stop position H1 for loading of objects W, the process of traveling from the stop position H1 to the stop position H2, the process of stopping at the stop position H2 for unloading of objects W, and the process of traveling from the stop position H2 to the stop position H1. In the following description, this series of processes (the four processes listed above) that one AGV V go through is referred to as one cycle.

The scheme used by the AGVs V to detect the circulation route L and the stop positions H is not limited. For example, a magnetic tape or a reflection tape may be attached to the floor surface along the circulation route L such that the AGVs V detect the tape with a magnetic sensor or an optical sensor. The AGVs may be configured to detect their current positions while traveling and stopping. Alternatively, the AGVs V may be configured to travel on a rail disposed along the circulation route L. Driving of wheels may be controlled by a program such that the AGVs V stop at the stop positions H. Any method may be used that enables the AGVs V to travel along the circulation route L and stop at the stop positions H.

Each AGV V operates on electric power stored in a built-in capacitor 31 (described later) to travel automatically along the circulation route L. Specifically, the AGV V travels by driving a motor 32 to rotate the wheels with the electric power stored in the capacitor 31. The AGV V also includes a power receiver B in which electric power received is stored (charged) in the capacitor 31.

The power transmitters A wirelessly transmit electric power to an AGV V. As shown in FIG. 1A, the power transmitters A are installed at the respective stop positions H. While an AGV V is parked at a stop position H, the power transmitter A located at the stop position H wirelessly transmits electric power to the power receiver B mounted on the AGV V. In FIG. 1A, the AGV V1 is stopped at the stop position H1 and the power receiver B mounted thereon is receiving power from the power transmitter A1. Similarly, the AGV V3 is stopped at the stop position H2 and the power receiver B mounted thereon is receiving power from the power transmitter A2.

Each power receiver B has a power-receiving coil Lr, which is a planar coil wound in a spiral shape. The power-receiving coil Lr is disposed on a side surface of the body of the AGV V (the right-side surface in FIG. 1A) such that the coil surface is substantially perpendicular to the floor surface. Each power transmitter A has a power-transmitting coil Lt, which is a planar coil wound in a spiral shape. The power-transmitting coil Lt is arranged such that the coil surface is substantially perpendicular to the floor surface. The power transmitter A is arranged and oriented at a predetermined spot in the stop position H such that the power-transmitting coil Lt faces with the power-receiving coil Lr of an AGV V a slight distance in between when the AGV comes to stop at the stop position H. In the example shown in FIG. 1A, the power-receiving coil Lr is disposed on the right side surface of the AGV V and the AGV V travels clockwise. For this reason, each power transmitter A is disposed on the inner side of the circulation route L such that the power-transmitting coil Lt is substantially parallel to the circulation route L. In a case where each AGV V travels counterclockwise or the power-receiving coil Lr is disposed on the left side surface of the AGV V, each power transmitter A is disposed on the outer side of the circulation route L. As shown in FIG. 1B, the power-transmitting coil Lt and the power-receiving coil Lr are placed at the same height. Note, however, that the power-transmitting coil Lt and the power-receiving coil Lr are not limited in terms of the shape and the number of turns.

Alternatively, each power-receiving coil Lr may be disposed on the bottom surface of the body of the AGV V such that the coil surface is substantially parallel to the floor surface, and each power-transmitting coil Lt may be disposed on the floor surface such that the coil surface is substantially parallel to the floor surface. In this case, the distance between the floor surface and the bottom surface of the body of the AGV V is constant. Therefore, the distance between the coil surface of the power-receiving coil Lr and that of the power-transmitting coil Lt is constant when the AGV H comes to stop at a stop position H. In this case, it is necessary to prevent the mechanism of the AGV V for detecting the circulation route L or stop positions H from interfering with power transmission/reception between the power-transmitting coil Lt and the power-receiving coil Lr.

Figure 2:
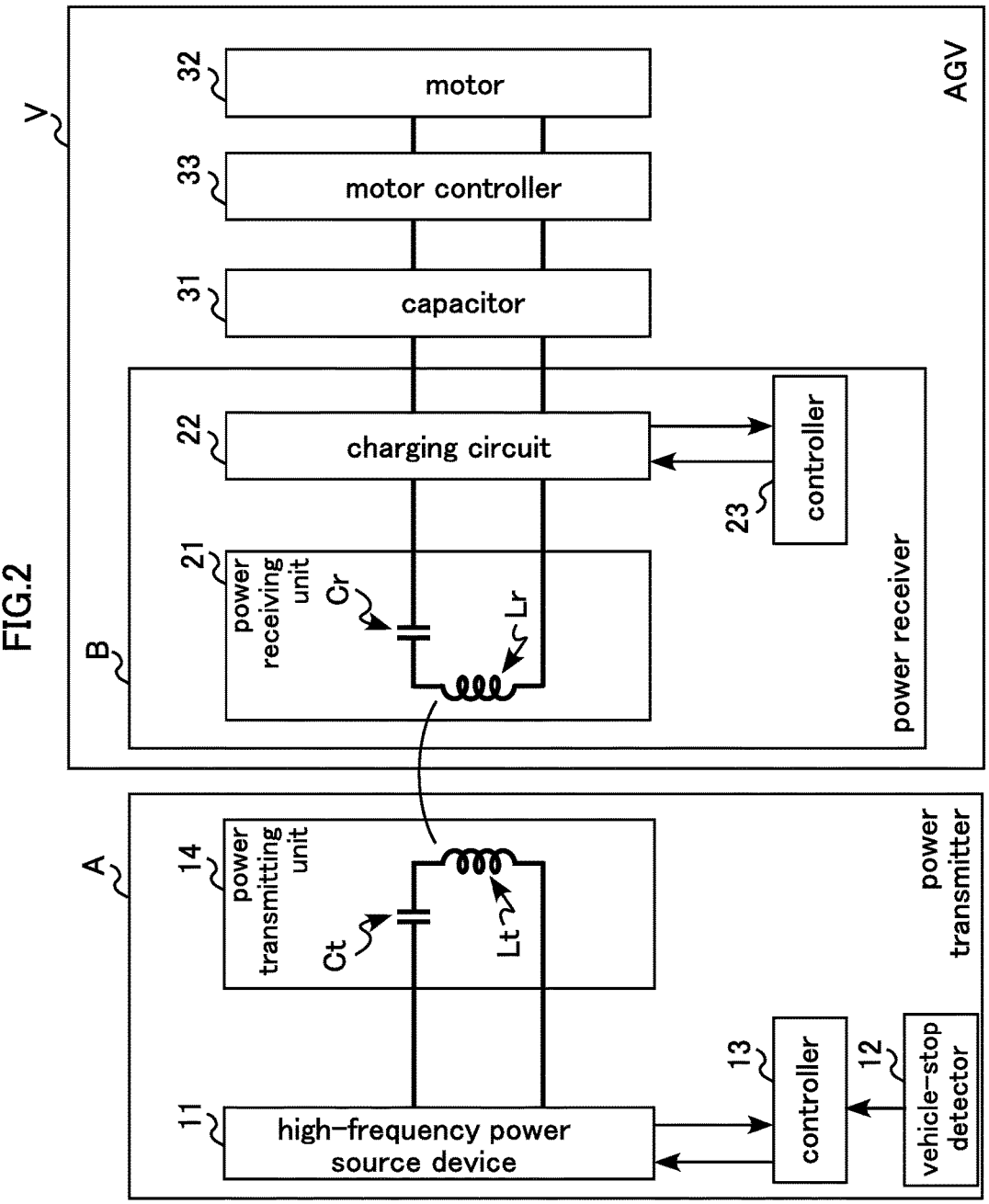
FIG. 2 is a block diagram showing an example of the overall structure of an AGV system according to a first embodiment of the present disclosure.
Figure 3:
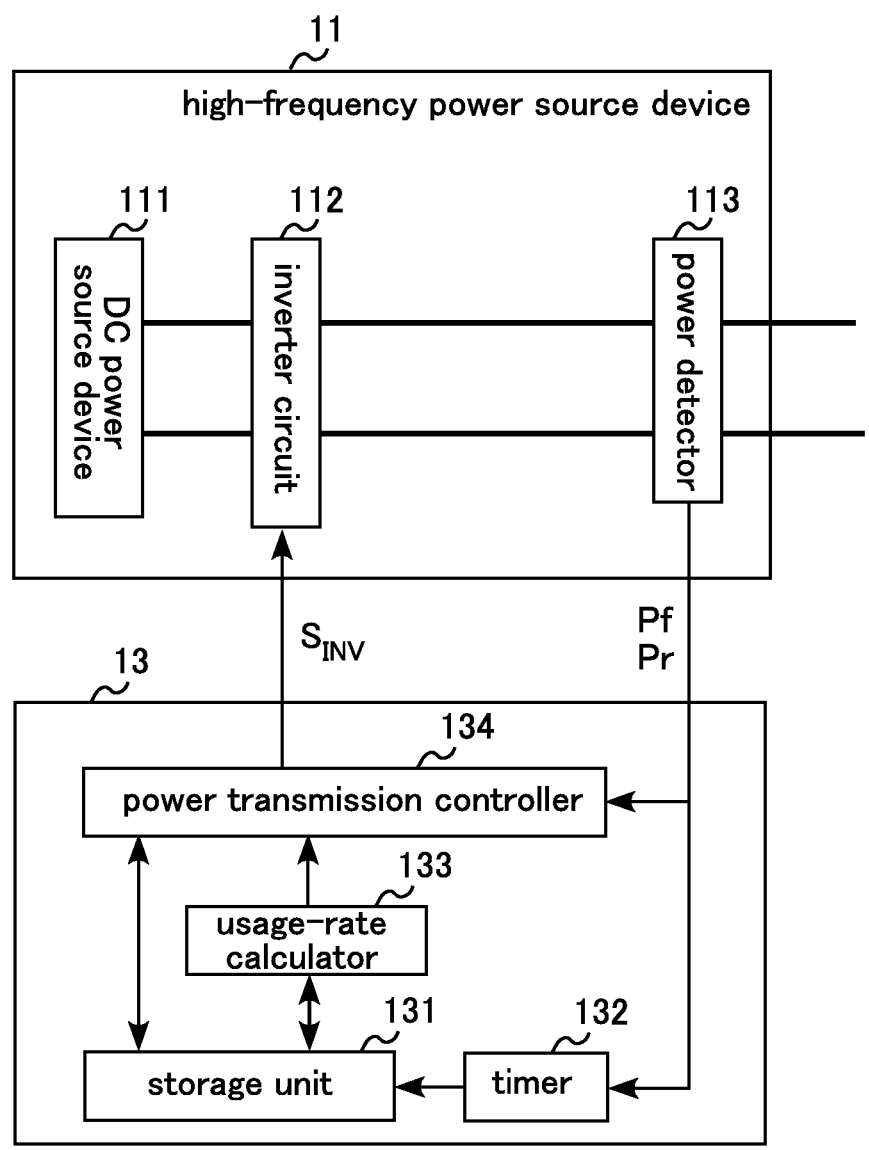
FIG. 3 is a block diagram showing, in detail, an example of the structure of a power transmitter according to the first embodiment of the present disclosure.
Figure 4:
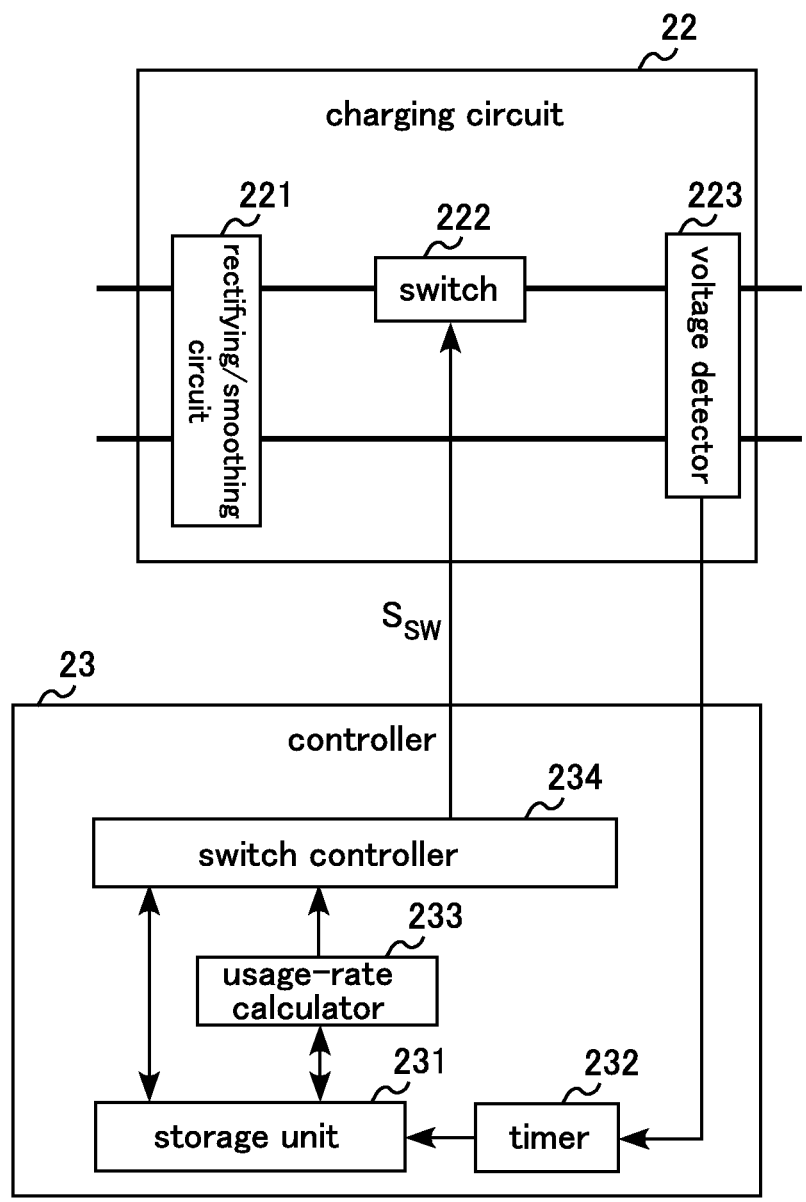
FIG. 4 is a block diagram showing, in detail, an example of the structure of an AGV according to the first embodiment of the present disclosure.

FIGS. 2 to 4 are block diagrams specifically showing the functional structure of a power transmitter A and an AGV V according to the first embodiment. FIG. 2 shows an example of the overall structure of the power transmitter A and the AGV V. FIG. 2 shows the state in which the AGV V is stopped at a stop position H and thus the power-transmitting coil Lt of the power transmitter A faces the power-receiving coil Lr of the power receiver B with a slight distance in between. FIG. 3 shows part of the power transmitter A in detail, whereas FIG. 4 shows part of the AGV V in detail.

As shown in FIG. 2, the power transmitter A includes a high-frequency power source device 11, a vehicle-stop detector 12, a controller 13, and a power transmitting unit 14. The AGV V includes a power receiver B, a capacitor 31, a motor 32, and a motor controller 33.

The high-frequency power source device 11 supplies high-frequency power to the power transmitting unit 14. As shown in FIG. 3, the high-frequency power source device 11 includes a direct current (DC) power source device 111, an inverter circuit 112, and a power detector 113. The high-frequency power source device 11 may additionally include a matching circuit between the inverter circuit 112 and the power detector 113 for matching the impedances.

The DC power source device 111 generates and outputs DC power. The DC power source device 111 includes a rectifying circuit, a smoothing capacitor, and a DC-DC converter circuit. The DC power source device 111 uses a rectifying circuit to rectify an AC voltage (e.g. commercial voltage of 200 V) supplied from a commercial power supply and uses a smoothing circuit to smooth the resulting voltage, thereby performing conversion into a DC voltage. The DC-DC converter circuit converts the DC voltage into a DC voltage of a predetermined level (target voltage) and outputs the resulting DC voltage to the inverter circuit 112. The structure of the DC power source device 111 is not limited, and may be any DC power source device capable of outputting a DC voltage of a predetermined level.

The inverter circuit 112 converts a DC power into a high-frequency power. Specifically, the inverter circuit 112 converts the DC voltage supplied from the DC power source device 111 into a high-frequency voltage and outputs the resulting voltage to the power transmitting unit 14. For example, the inverter circuit 112 may be a single-phase full bridge inverter circuit having four switching elements. In the present embodiment, the switching elements are implemented by metal-oxide-semiconductor field-effect transistors (MOSFETs). Note that the switching elements are not limited to MOSFETs and may alternatively be bipolar transistors or insulated gate bipolar transistors (IGBTs), for example.

The inverter circuit 112 receives a high-frequency control signal $S_{INV}$ from the controller 13 and operates the switching elements for switching between the on state and the off state in response to the high-frequency control signal $S_{INV}$ so as to convert DC power to high-frequency power. The high-frequency control signal $S_{INV}$ is a pulse signal (which may be a sine wave signal) that repeats a high level and a low level at a predetermined frequency $f_0$. Since the switching elements are switched at the frequency $f_0$, it may be referred to as "switching frequency $f_0$" in the description below. Each switching element enters the off state when the high-frequency control signal $S_{INV}$ is at the low level, and enters the on state when the high-frequency control signal $S_{INV}$ is at the high level.

The power detector 113 detects forward power Pf and reflected power Pr at a location of the power detector 113. The power detector 113 includes a directional coupler to detect the forward voltage Vf and reflected voltage Vr present in high-frequency voltage. Then, the power detector 113 converts the forward voltage Vf to forward power Pf and the reflected voltage Vr to reflected power Pr and outputs the resulting values to the controller 13.

The vehicle-stop detector 12 detects an AGV V that is stopped (parked) at the power supply point (the stop position H where the power transmitter A is installed). The vehicle-stop detector 12 may include a non-contact optical sensor (photovoltaic sensor) that detects the presence of a physical object with visible or infrared light. The vehicle-stop detector 12 determines that an AGV V is parked at the power supply point upon detecting a physical object. The vehicle-stop detector 12 is not limited to such a structure and may alternatively be any other detector capable of detecting an AGV V parked at the power supply point of the power transmitter A.

The controller 13 controls the high-frequency power source device 11 and includes, for example, a microcomputer, which has a central processing unit (CPU), a read only memory (ROM), a random access memory (RAM), and/or a field-programmable gate array (FPGA), in addition to memory storing various types of information. As shown in FIG. 3, the controller 13 includes a storage unit 131, a timer 132, a usage-rate calculator 133, and a power transmission controller 134.

The storage unit 131 may be a storage device, such as flash memory or a hard disk drive (HDD), and stores various types of information used by the controller 13 for power transmission control.

The timer 132 measures a time period during which the power transmitter A supplies power (hereinafter, "transmission period") and the time period during which the power transmitter suspends power transmission (hereinafter, "transmission suspension period"). Specifically, the timer 132 monitors the value of forward power Pf received from the power detector 113 and determines that power is currently being transmitted as long as the forward power Pf is detected. When the forward power Pf is no longer detected, the timer 132 determines that power transmission is suspended. Based on the determinations, the timer 132 measures a transmission period and a transmission suspension period and stores each measured period to the storage unit 131 as a power supply history.

The usage-rate calculator 133 calculates the usage rate of the power transmitter A (hereinafter, transmitter usage rate R1). The transmitter usage rate R1 is a rate (a percentage, in this embodiment) of the transmission time per unit time and is given by the following arithmetic expression:

Transmitter Usage Rate $R1$ [%]=(Transmission Time/Unit Time)×100

In other words, the transmitter usage rate R1 indicates how long the power transmitter A is used per unit time. In the present embodiment, the time needed for the AGVs V to complete one cycle is determined as the unit time of the power transmitters A. Specifically, the usage-rate calculator 133 uses the power supply history stored in the storage unit 131 to calculate a total transmission period, which is the sum of the transmission periods measured in a period of one unit time in the past from the current time. Then, the values of the total transmission period and the unit time are substituted into the arithmetic expression noted above to yield the transmitter usage rate R1. The power supply history stored in the storage unit 131 may contain data measured in a period of at least one unit time in the past from the current time.

The power transmission controller 134 controls the high-frequency power source device 11 so as to control transmission of high-frequency power from the power transmitter A. Specifically, the power transmission controller 134 issues a high-frequency power control signal $S_{INV}$ to the inverter circuit 112, causing the high-frequency power source device 11 to output high-frequency power. In this way, the power transmitter A starts to transmit high-frequency power. The power transmission controller 134 stops issuing a high-frequency power control signal $S_{INV}$ to the inverter circuit 112, causing the high-frequency power source device 11 to stop outputting high-frequency power. In this way, the power transmitter A stops transmission of high-frequency power. In the present embodiment, the power transmission controller 134 operates according to the result detected by the vehicle-stop detector 12. That is, the power transmission controller 134 causes the high-frequency power source device 11 to output high-frequency power when an AGV V is detected at the power supply point of the power transmitter A (i.e., when there is an AGV V parked at the stop position), and causes the high-frequency power source device 11 to stop outputting high-frequency power when no AGV V is detected at the power transmitter A (when there is no AGV V parked at the stop position).

The power transmission controller 134 issues the high-frequency power control signal $S_{INV}$ based on the value of forward power Pf received from the power detector 113, so as to change the forward power Pf to a value closer to a set value (target power value). The target power value is set to ensure that each power transmitter A will charge an AGV V with an amount of power required for the AGV V to travel from the current stop position H to the next stop position (for example, from the stop position H1 to the stop position H2 shown in FIG. 1A). In the present embodiment, the stopping time Ts for an AGV V to stay at each stop position H is fixed in advance. Consequently, the magnitude of electric power that needs to be transmitted is specifically determined for an AGV V to store the required amount of power within the stopping time Ts. As mentioned above, the power transmission controller 134 monitors the reflected power Pr received from the power detector 113 and stops issuing the high-frequency power control signal $S_{INV}$ when the reflected power Pr reaches a threshold set in advance. With no high-frequency power control signal $S_{INV}$, no high-frequency power source device 11 is transmitted.

The power transmission controller 134 stops issuing the high-frequency power control signal $S_{INV}$ when the transmitter usage rate R1 received from the usage-rate calculator 133 has exceeded a threshold X1 set for the transmitter usage rate R1. In this way, the power transmitter A stops power transmission. In the present embodiment, the threshold X1 of the transmitter usage rate R1 is stored in advance in the storage unit 131. Details of the threshold X1 of the transmitter usage rate R1 will be described later.

Figure 5:
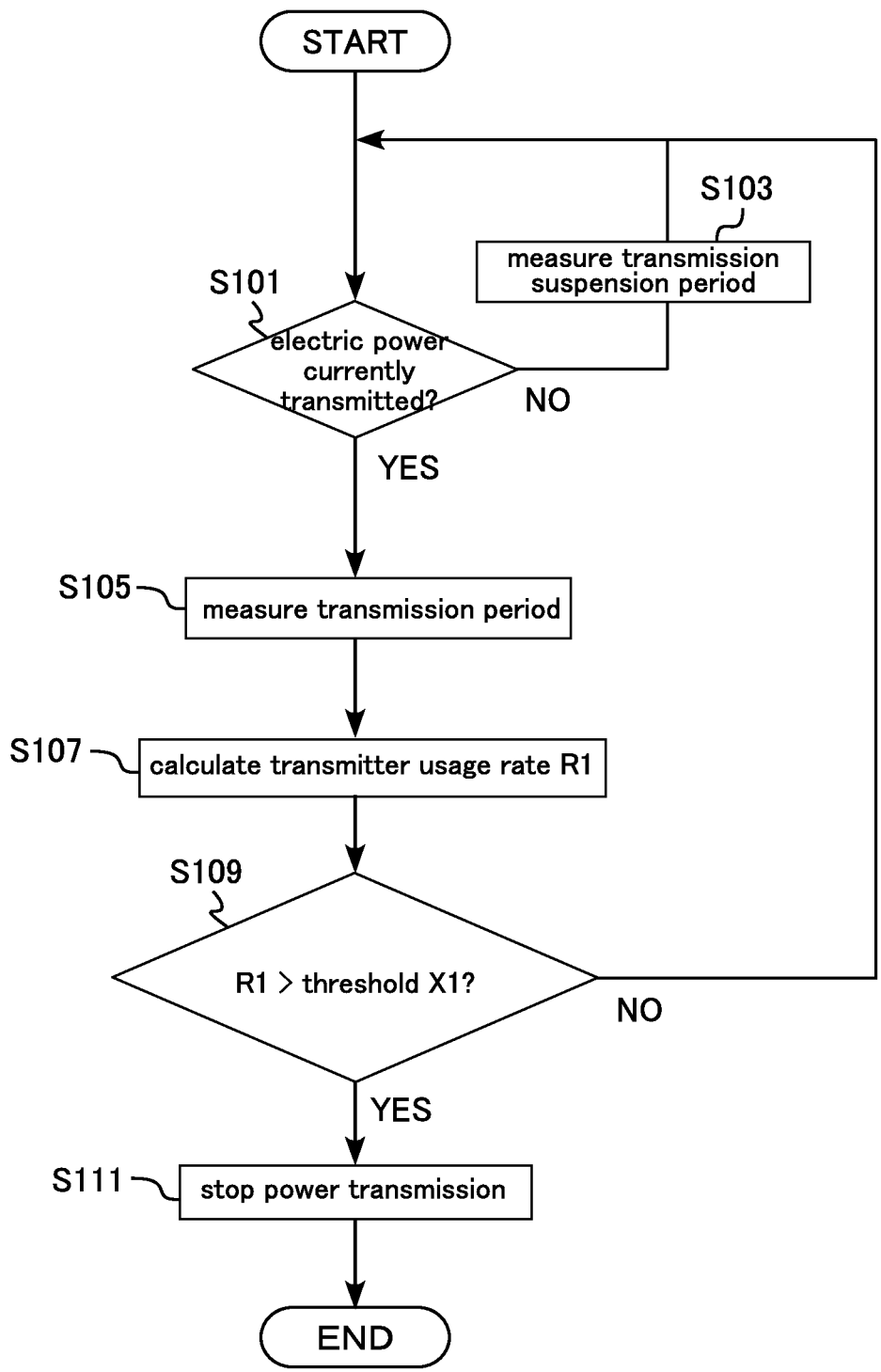
FIG. 5 is a flowchart showing power transmission stop control by a power transmitter (controller).

FIG. 5 is a flowchart illustrating power transmission stop control by the controller 13 based on the transmitter usage rate R1. Note that the controller 13 repeats the power transmission stop control shown in FIG. 5.

Based on the forward power Pf detected by the power detector 113, the controller 13 determines whether the power transmitter A is currently transmitting electric power (Step S101). On determining that no power is being transmitted, the timer 132 measures the period of ongoing suspension of power transmission and adds the measured transmission suspension period to the power supply history stored in the storage unit 131 (Step S103). On determining that the power is being transmitted, the timer 132 measures the period of ongoing power transmission and adds the measured transmission period to the power supply history stored in the storage unit 131 (Step S105).

The usage-rate calculator 133 then reads the power supply history from the storage unit 131 to calculate the transmitter usage rate R1 based on the power supply history (Step S107). The usage-rate calculator 133 outputs the resulting transmitter usage rate R1 to the power transmission controller 134.

The power transmission controller 134 compares to see if the transmitter usage rate R1 received from the usage-rate calculator 133 has exceeded the threshold X1 (step S109). If the transmitter usage rate R1 has not exceeded the threshold X1, the process returns to Step S101. If the transmitter usage rate R1 has exceeded the threshold X1, the power transmission controller 134 operates such that the power transmitter A stops power transmission (Step S111).

Through the power transmission stop control shown in FIG. 5, the controller 13 is enabled to stop the transmission of high-frequency power based on the transmitter usage rate R1.

With reference again to FIG. 2, the power transmitting unit 14 includes a power-transmitting coil Lt and a resonance capacitor Ct. The power-transmitting coil Lt transmits high-frequency power supplied by the high-frequency power source device 11 to the power receiver B (mounted on an AGV V). The resonance capacitor Ct is connected in series to the power-transmitting coil Lt to constitute a serial resonance circuit. Alternatively, the resonance capacitor Ct may be connected in parallel to the power-transmitting coil Lt to constitute a parallel resonance circuit.

The power-transmitting coil Lt and the resonance capacitor Ct are designed such that the resonant frequency matches the frequency $f_0$ (switching frequency $f_0$) of high-frequency power supplied from the high-frequency power source device 11. That is, the power-transmitting coil Lt and the resonance capacitor Ct are designed such that the self-inductance Lt of the power-transmitting coil Lt and the capacitance Ct of the resonance capacitor Ct are in the relationship represented by the formula (1) below. Note that if the switching frequency $f_0$ is high, the floating capacitance between the windings of the power-transmitting coil Lt may be used as the resonance capacitor Ct.

$$2\pi f_0 L_t = \frac{1}{2\pi f_0 C_t} \tag{1}$$

Each power receiver B wirelessly receives high-frequency power transmitted from a power transmitter A. The power receiver B converts the received high-frequency power into a power having an appropriate electrical characteristic and supplies the resulting power to charge the capacitor 31. The power receiver B includes a power receiving unit 21, a charging circuit 22, and a controller 23.

The power receiving unit 21 includes a power-receiving coil Lr and a resonance capacitor Cr. The power-receiving coil Lr is magnetically coupled to the power-transmitting coil Lt to wirelessly receive high-frequency power transmitted from power transmitter A (from the power transmitting unit 14). The resonance capacitor Cr is connected in series to the power-receiving coil Lr to constitute a serial resonance circuit. Alternatively, the resonance capacitor Cr may be connected in parallel to the power-receiving coil Lr to constitute a parallel resonance circuit.

Similarly to the power-transmitting coil Lt and the resonance capacitor Ct, the power-receiving coil Lr and the resonance capacitor Cr are designed such that the resonant frequency matches the frequency $f_0$ (switching frequency $f_0$) of high-frequency power supplied from the high-frequency power source device 11. Note that if the switching frequency $f_0$ is high, the floating capacitance between the windings of the power-receiving coil Lr may be used as the resonance capacitor Cr.

The power-receiving coil Lr and the power-transmitting coil Lt are magnetically coupled so that the power receiver B wirelessly receives high-frequency power from the power transmitter A. That is, in response to a high-frequency current flowing in the power-transmitting coil Lt, a change is caused in the magnetic flux that interlinks the power-receiving coil Lr so as to induce a high-frequency current in the in the power-receiving coil Lr. In this way, electric power is supplied wirelessly from the power transmitter A to the power receiver B. FIG. 2 shows a state in which the power-receiving coil Lr and the power-transmitting coil Lt are magnetically coupled to each other.

The power transmitting unit 14 and the power receiving unit 21 are both resonance circuits and resonantly coupled to each other. That is, the power transmitting unit 14 transmits electric power to the power receiving unit 21 wirelessly by magnetic field resonance. The power receiving unit 21 outputs the received electric power to a charging circuit 22.

Preferably, the power receiving unit 21 of the present embodiment produces a constant current output. In a case where the inverter circuit 112 is a voltage inverter, the power transmitting unit 14 is implemented by a series resonance circuit in which the power-transmitting coil Lt and the resonance capacitor Ct are connected in series. Then, the power receiving unit 21 is implemented by a series resonance circuit in which the power-receiving coil Lr and the resonance capacitor Cr are connected in series. In a case where the inverter circuit 112 is a current inverter, the power transmitting unit 14 is implemented by a series resonance circuit in which the power-transmitting coil Lt and the resonance capacitor Ct are connected in series. Then, the power receiving unit 21 is implemented by a parallel resonance circuit in which the power-receiving coil Lr and the resonance capacitor Cr are connected in parallel. In a case where the inverter circuit 112 is a current inverter and a voltage-current converting circuit is provided downstream of the power receiving unit 21, the power transmitting unit 14 is implemented by a series resonance circuit in which the power-transmitting coil Lt and the resonance capacitor Ct are connected in series. Then, the power receiving unit 21 is implemented by a series resonance circuit in which the power-receiving coil Lr and the resonance capacitor Cr are connected in series.

The charging circuit 22 converts high-frequency power supplied from the power receiving unit 21 into a power having an appropriate electrical characteristic (DC power) and supplies the resulting power to the capacitor 31. As shown in FIG. 4, the charging circuit 22 includes a rectifying/smoothing circuit 221, a switch 222, and a voltage detector 223.

The rectifying/smoothing circuit 221 rectifies high-frequency current output from the power receiving unit 21, thereby performing conversion into a DC current. The rectifying/smoothing circuit 221 includes a full-wave rectifying circuit obtained by bridge-connecting four diodes. The rectifying/smoothing circuit 221 also includes a smoothing circuit for smoothing the rectified output. The structure of the rectifying/smoothing circuit 221 is not limited, and may be any circuit capable of converting a high-frequency current into a DC current. The DC current output from the rectifying/smoothing circuit 221 is supplied to the capacitor 31.

The switch 222 is operated to interrupt or allow the flow of direct current from the rectifying/smoothing circuit 221 to the capacitor 31. In the present embodiment, the switch 222 is connected in series to the high-voltage output terminal of the rectifying/smoothing circuit 221. Alternatively, the switch 222 may be connected in series to the low-voltage output terminal of the rectifying/smoothing circuit 221 or between the power receiving unit 21 and the rectifying/smoothing circuit 221. Here, the connection is made in parallel on condition that the power receiving unit 21 is configured to produce current output, and in series on condition that the power receiving unit 21 is configured to produce voltage output.

The switch 222 may be implemented by MOSFET to switch between a conducting state and an open state in accordance with a switching signal $S_{SW}$ received from the controller 23. Specifically, upon receipt of a switching signal $S_{SW}$ at ON voltage, the switch 222 enters the conducting state, so that the current path to the capacitor 31 is electrically connected to allow the flow of DC power to the capacitor 31. As a result, the capacitor 31 is charged. Upon receipt of a switching signal $S_{SW}$ at OFF voltage, the switch 222 enters the open state, so that the current path to the capacitor 31 is electrically disconnected to interrupt the flow of DC power to the capacitor 31. As a result, the capacitor 31 is electrically isolated from the power supply, and charging of the capacitor 31 is stopped. Alternatively to the MOSFET mentioned above, the switch 222 may be implemented by a semiconductor switch, such as another electric filed transistor, bipolar transistor or IGBT, or a mechanical switch, such as a relay switch.

The voltage detector 223 detects the charge voltage of the capacitor 31 and outputs the value of detected charge voltage to the controller 23.

The controller 23 controls the charging circuit 22 and includes, for example, a microcomputer, which has a CPU, ROM, and RAM, and/or an FPGA, in addition to memory storing various types of information. The controller 23 includes a storage unit 231, a timer 232, a usage-rate calculator 233, and a switch controller 234.

The storage unit 231 may be a storage device such as a flash memory or HDD and stores various types of information used by the controller 23 for charge control of the capacitor 31.

The timer 232 measures a time period during which the power receiver B receives power from the power transmitter A (hereinafter, "reception period") and a time period during which the power receiver B suspends power reception from the power transmitter A (hereinafter, "reception suspension period"). Specifically, the timer 232 monitors the value of charge voltage received from the voltage detector 223 and determines that the power receiver B is currently receiving power as long as the charge voltage is increasing, and that the power receiver B is not receiving power when the charge voltage is decreasing. When the charge voltage stays unchanged, the timer 232 determines that the power receiver B is not receiving power. Based on the determinations, the timer 232 measures a reception period and a reception suspension period and stores the measured periods to the storage unit 231 as a power reception history.

The usage-rate calculator 233 calculates the usage rate of the power receiver B (hereinafter, receiver usage rate R2). The receiver usage rate R2 is a rate (a percentage, in this embodiment) of the reception time per unit time and is given by the following arithmetic expression:

Receiver Usage Rate $R2$ [%]=(Reception Time/Unit Time)×100[%]

In other words, the receiver usage rate R2 indicates how long the power receiver B is used per unit time. In the present embodiment, the time needed for the AGVs V to complete one cycle is determined as the unit time of the AGVs V, in the same way as the unit time of the power transmitters A. However, the unit time of the power receivers B may be different from the unit time of the power transmitters A. Specifically, the usage-rate calculator 233 uses the power reception history stored in the storage unit 231 to calculate a total reception period, which is the sum of the reception periods measured in a period of one unit time in the past from the current time. Then, the values of the total reception period and the unit time are substituted into the arithmetic expression noted above to yield the receiver usage rate R2. The power reception history stored in the storage unit 231 may contain data measured in a period of at least one unit time in the past form the current time.

The switch controller 234 controls switching of the switch 222 of the charging circuit 22. The switch controller 234 normally places the switch 222 in a conducting state, and places the switch 222 into an open state when the receiver usage rate R2 received from the usage-rate calculator 233 has exceeded a threshold X2 set for the receiver usage rate R2. In the present embodiment, the threshold X2 of the receiver usage rate R2 is stored in advance in the storage unit 231. Details of the threshold X2 of the receiver usage rate R2 will be described later.

By placing the switch 222 from the conducting state to the open state, the switch controller 234 interrupts the DC power flowing from the charging circuit 22 to the capacitor 31. With the DC power interruption, the capacitor 31 no longer consumes electric power, causing the reflected power Pr detected by the power detector 113 to increase abruptly to reach the reflected power Pr. Consequently, the power transmission controller 134 determines that a request to stop power transmission is made by the power receiver B and thus controls the high-frequency power source device 11 to stop outputting high-frequency power. In this way, the power transmitter A stops transmitting power and thus the power receiver B stops receiving power. In other words, in response to the receiver usage rate R2 exceeding the threshold X2, the switch controller 234 can cause the power receiver B to stop receiving high-frequency power, by placing the switch 222 from the conducting state to the open state.

Figure 6:
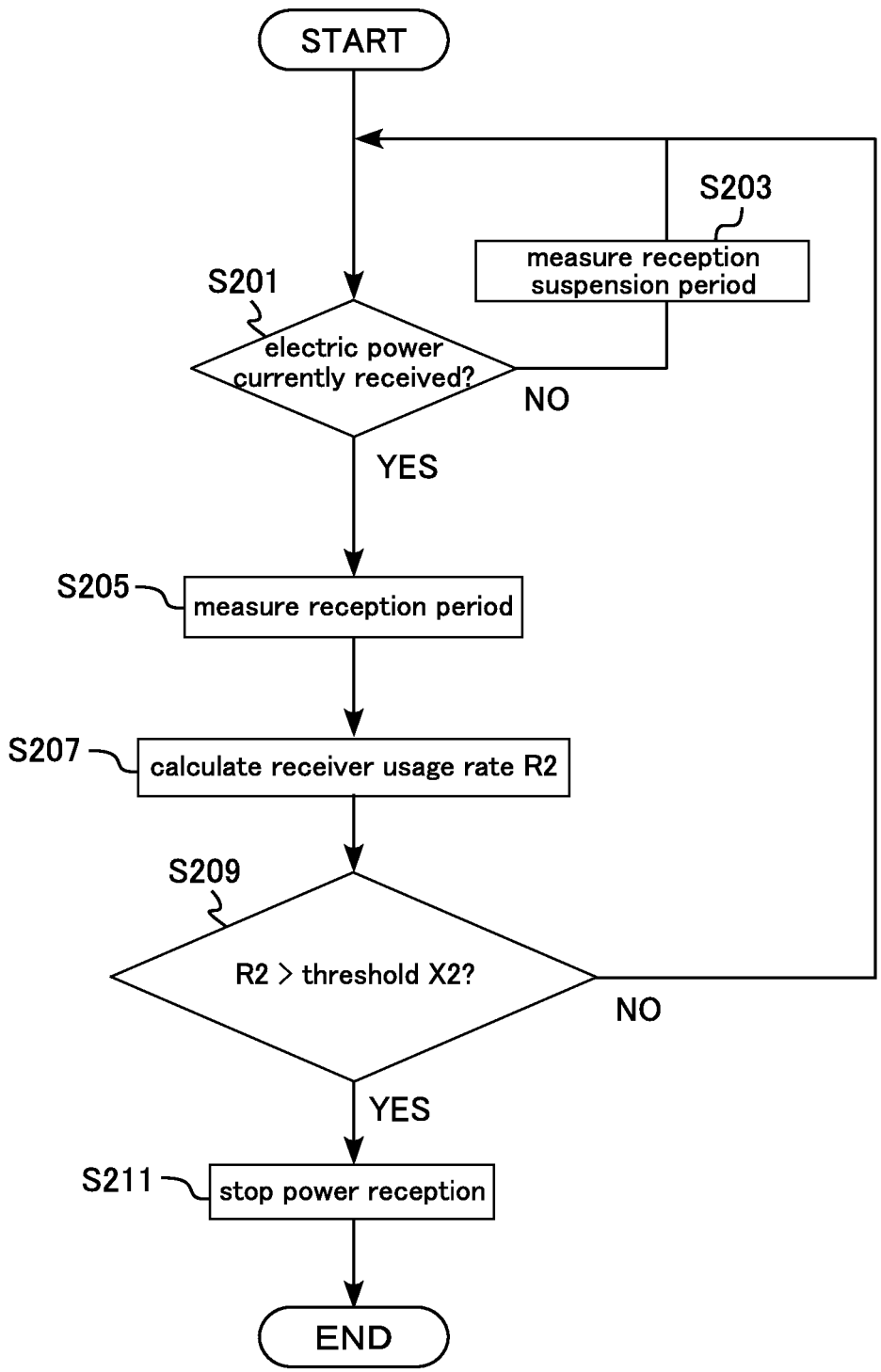
FIG. 6 is a flowchart showing power reception stop control by an AGV (controller).

FIG. 6 is a flowchart illustrating the power reception stop control performed by the controller 23 based on the receiver usage rate R2. Note that the controller 23 repeats the power reception stop control shown in FIG. 6.

Based on the charge voltage detected by the voltage detector 223, the controller 23 determines whether the power receiver B is currently receiving electric power (Step S201). On determining that no power is being received, the timer 232 measures the period of ongoing suspension of power reception and adds the measured reception suspension period to the power reception history stored in the storage unit 231 (Step S203). On determining that electric power is being received, the timer 232 measures the period of ongoing power reception and adds the measured reception period to the power reception history stored in the storage unit 231 (Step S205).

The usage-rate calculator 233 then reads the power reception history from the storage unit 231 to calculate the receiver usage rate R2 based on the power reception history (Step S207). The usage-rate calculator 233 outputs the resulting receiver usage rate R2 to the switch controller 234.

The switch controller 234 compares to see if the receiver usage rate R2 received from the usage-rate calculator 233 has exceeded the threshold X2 (step S209). If the receiver usage rate R2 has not exceeded the threshold X2, the process returns to Step S201. At this time, the switch controller 234 maintains the switch 222 in the conducting state to keep the current path electrically connected to the capacitor 31. If the receiver usage rate R2 has exceeded the threshold X2, the switch controller 234 places the switch 222 to the open state to electrically disconnect the current path to the capacitor 31. As a result, charging of the capacitor 31 is stopped and thus the reflected power Pr increases abruptly. Through this abrupt increase in the reflected power Pr, the power receiver B transmits a notification to the power transmitter A (i.e., the power receiver B notifies the power transmitter A that power transmission is requested to be stopped). In response to the power transmitter A receiving the notification, the power transmitter A stops transmitting power, and thus the power receiver B stops receiving power (Step S211).

Through the power reception stop control illustrated in FIG. 6, the controller 23 is enabled to cause the power receiver B to stop power reception based on the receiver usage rate R2.

With reference again to FIG. 2, the capacitor 31 is provided for storing electric power and may be implemented by connecting capacitors, such as electric double-layer capacitors or lithium ion capacitors, in series-parallel connection to obtain a required capacitance. Capacitors compare favorably with other power storage devices for use in a charging system that repeats charging and discharging cycles within a short time period because capacitors deteriorate less through charging and discharging and thus have a longer service life. In the present embodiment, the high-frequency current received by the power receiving unit 21 is rectified by the charging circuit 22 (rectifying/smoothing circuit 221) and outputted to the capacitor 31. In this way, the capacitor 31 is charged to supply electric power to the motor 32 via the motor controller 33.

Although the capacitor 31 is used in the present embodiment, any other component that stores electric energy can be used. Examples of such a component include a secondary battery such as a lead battery or a lithium-ion battery.

The motor 32 operates on dive current or drive voltage input thereto to produce rotary force. In the present embodiment, the motor 32 transmits the rotary force to the wheels of the AGV V. As a result, the wheels rotate to cause the AGV V to move. The motor 32 may be implemented by a DC motor or an AC motor.

The motor controller 33 controls to drive the motor 32 using the electric power stored on the capacitor 31. The motor controller 33 may be implemented by a DC-DC converter and transforms the voltage inputted from the capacitor 31 to a drive voltage (e.g., 24 V or 48 V) for driving the motor 32 and applies it to the motor 32. The motor controller 33 supplies a predetermined drive voltage to the motor 32 although the voltage of the capacitor 31 varies depending on the charged amount. The motor controller 33 is not limited to the specific structure described above and may be changed appropriately depending on the type of the motor 32.

The motor controller 33 stops the motor 32 when the AGV V has arrived at a stop position H and drives the motor 32 to cause the AGV V to run. The electric power for driving the motor 32 is supplied from the capacitor 31. When the AGV V travels, the electric energy stored in the capacitor 31 is consumed by driving the motor 32.

The following now describes the threshold X1 of the transmitter usage rate R1 set for the power transmitters A and the receiver usage rate R2 set for the AGVs V (power receivers B). The thresholds X1 and X2 are appropriately determined depending on the structure of the AGV system S1.

FIGS. 7A to 7E are views for describing the thresholds X1 and X2 set for an AGV system S1 of example 1. The AGV system S1 of this example includes two power transmitters A1 and A2 and two AGVs V1 and V2 that are provided for one circulation route L. In the example shown in FIGS. 7A to 7E, the stopping time Ts for which the AGVs V1 and V2 are stopped at each of the stop positions H1 and H2 is 20 seconds. The traveling time taken for the AGVs V1 and V2 to travel from the stop position H1 to the stop position H2 or from the stop position H2 to the stop position H1 is 40 seconds.

FIG. 7A shows the overall structure of the AGV system S1 of this example. In the figure, objects W held at the stop positions H1 and H2 are not shown. FIG. 7B shows the transition of the power transmitter A1 between the transmission period and the transmission suspension period during normal operation of the AGV system S1 shown in FIG. 7A. FIG. 7C shows the transition of the power transmitter A2 between the transmission period and the transmission suspension period during normal operation of the AGV system S1 shown in FIG. 7A. In FIGS. 7B and 7C, each transmission period is represented by a solid filled rectangle. To assist the understanding, white letters are shown on each rectangle to indicate the AGV (out of V1 and V2) to which power is transmitted. FIG. 7D shows the transition of the AGV V1 between the reception period and the reception suspension period during normal operation of the AGV system S1 shown in FIG. 7A. FIG. 7E shows the transition of the AGV V2 between the reception period and the reception suspension period during normal operation of the AGV system S1 shown in FIG. 7A. In FIGS. 7D and 7E, each reception period is represent by a solid filled rectangle. To assist the understanding, white letters are shown on each rectangle to indicate the power transmitter (out of A1 and A2) from which power is transmitted.

FIGS. 7B to 7E each cover a time span of 240 seconds (4 minutes) from 0 second at which the AGV V1 or V2 arrives at the stop position H1 or H2. In FIGS. 7B to 7E, the time necessary for one cycle is 120 seconds (=20+40+20+40 seconds), which means that the unit time mentioned above is 120 seconds.

In the AGV system S1 shown in FIG. 7A, each of the power transmitters A1 and A2 uses 20 seconds for transmitting power to each of the AGVs V1 and V2 and thus uses a total of 40 seconds per cycle (120 seconds). Thus, the rate (hereinafter "reference rate") of the total transmission period assumed for each of the power transmitters A1 and A2 per unit time (one cycle) is calculated to be 33.3% ($\approx$(40 sec/120 sec)×100). Therefore, setting the reference rate of 33.3% as the threshold X1 of the transmitter usage rate R1 will prevent the power transmitters A1 and A2 from performing power transmission for an amount of time exceeding the reference rate.

Similarly, each of the AGVs V1 and V2 uses 20 seconds for receiving power from each of the power transmitters A1 and A2 and thus uses a total of 40 seconds per cycle (120 seconds). Thus, the rate (hereinafter, "reference rate") of the total reception period assumed for each of the AGVs V1 and V2 per unit time (one cycle) is calculated to be 33.3% ($\approx$(40 sec/120 sec)×100). Therefore, setting the reference rate of 33.3% as the threshold X2 of the receiver usage rate R2 will prevent the AGVs V1 and V2 from performing power reception for an amount of time exceeding the reference rate.

As described above, the AGV system S1 shown in FIG. 7A is configured such that the power transmitters A1 and A2 each stop power transmission when the corresponding usage-rate calculator 133 calculates the transmitter usage rate R1 exceeding 33.3%. Similarly, the AGVs V1 and V2 each stop power reception when the corresponding usage-rate calculator 233 calculates the receiver usage rate R2 exceeding 33.30.

FIGS. 8A to 8E are views for describing the thresholds X1 and X2 for an AGV system S1 of example 2. The AGV system S1 of this example is similar to the AGV system S1 shown in FIGS. 7A to 7E, except that the traveling time taken for each AGV V to travel from the stop position H1 to the stop position H2 or from the stop position H2 to the stop position H1 is 60 seconds, which is longer than the 40-sec traveling time. FIGS. 8A to 8E correspond to FIGS. 7A to 7E, respectively.

In FIGS. 8B to 8E, the time necessary for one cycle is 160 seconds (=20+60+20+60 seconds), which means that the unit time mentioned above is 160 seconds.

In the AGV system S1 shown in FIG. 8A, each of the power transmitters A1 and A2 uses 20 seconds for transmitting power to each of the AGVs V1 and V2 and thus uses a total of 40 seconds per cycle (160 seconds). Thus, the reference rate of the total transmission period assumed for each of the power transmitters A1 and A2 per unit time (one cycle) is calculated to be 25.0% (=(40 sec/160 sec)×100). Therefore, setting the reference rate of 25.0% as the threshold X1 of the transmitter usage rate R1 will prevent the power transmitters A1 and A2 from performing power transmission for an amount of time exceeding the reference rate.

Similarly, each of the AGVs V1 and V2 uses 20 seconds for receiving power from each of the power transmitters A1 and A2 and thus uses a total of 40 seconds per cycle (160 seconds). Thus, the reference rate of the total reception period assumed for each of the AGVs V1 and V2 per unit time (one cycle) is calculated to be 25.0% (=(40 sec/160 sec)×100). Therefore, setting the reference rate of 25.0% as the threshold X2 of the receiver usage rate R2 will prevent the AGVs V1 and V2 from performing power reception for an amount of time exceeding the reference rate.

As described above, the AGV system S1 shown in FIG. 8A is configured such that the power transmitters A1 and A2 each stop power transmission when the corresponding usage-rate calculator 133 calculates the transmitter usage rate R1 exceeding 25.0%. Similarly, the AGVs V1 and V2 each stop power reception when the corresponding usage-rate calculator 233 calculates the receiver usage rate R2 exceeding 25.0%.

Figure 9A:
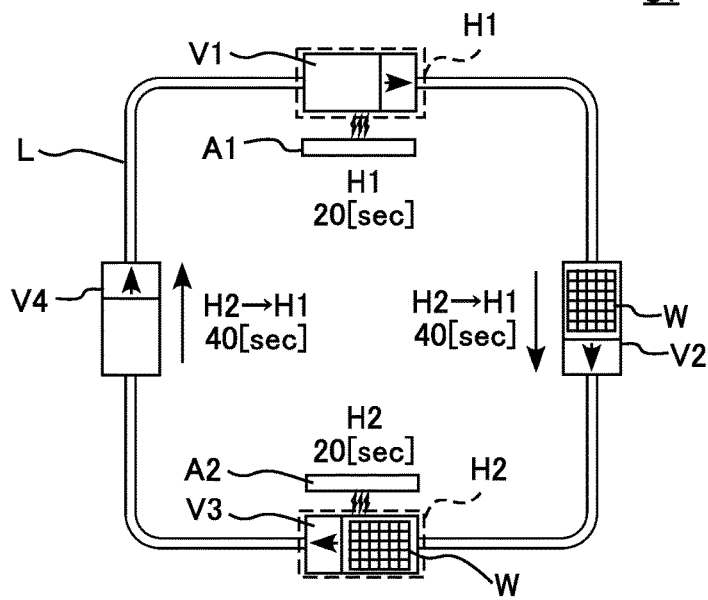
FIG. 9A is a view showing an AGV system of example 3 for describing thresholds of a transmitter usage rate and a receiver usage rate.

FIGS. 9A to 9G are views for describing the thresholds X1 and X2 for an AGV system S1 of example 3. The AGV system S1 of this example includes two power transmitters A1 and A2 and four AGVs V1 to V4 that are provided for one circulation route L. FIG. 9A includes a greater number of AGVs V than FIG. 7A. The example of FIGS. 9A to 9G is similar to the example of FIGS. 7A and 7E in that the stopping time Ts for which the AGVs V1 to V4 are stopped at each of the stop positions H1 and H2 is 20 seconds and that the traveling time taken for the AGVs V1 to V4 to travel from the stop position H1 to the stop position H2 or from the stop position H2 to the stop position H1 is 40 seconds.

FIG. 9A shows the overall structure of the AGV system S1 of this example. Similarly to FIG. 7A, FIG. 9A does not show objects W held at the stop positions H1 and H2. FIGS.

Figure 9B:
FIGS. 9B to 9G show a chart for describing thresholds of a transmitter usage rate and a receiver usage rate of the AGV system of example 3.
Figure 9C:
Figure 9D:
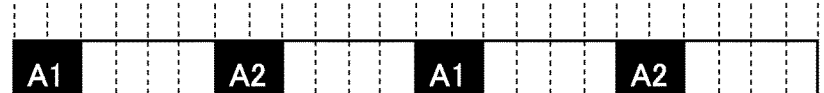
Figure 9E:
Figure 9F:
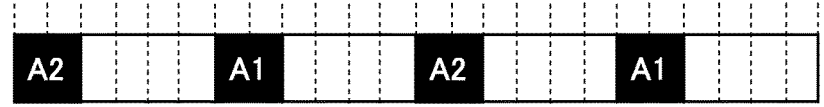
Figure 9G:

9B and 9c show the transition of the respective power transmitters A1 and A2 between the transmission period and the transmission suspension period during normal operation of the AGV system S1 shown in FIG. 9A. In FIGS. 9B and 9C, each transmission period is represented by a solid filled rectangle. To assist the understanding, white letters are shown on each rectangle to indicate the AGV out of V1 to V4 to which the power is transmitted. FIGS. 9D to 9G show the transition of respective AGVs V1 to V4 between the reception period and the reception suspension period during normal operation of the AGV system S1 shown in FIG. 9A. In FIGS. 9D to 9G, each reception period is represented by a solid filled rectangle. To assist the understanding, white letters are shown on each rectangle to indicate the power transmitter (out of A1 and A2) from which the power is transmitted.

FIGS. 9B to 9G are similar to FIGS. 7B to 7E in that the time necessary for one cycle is 120 seconds (=20+40+20+40 seconds), which means that the unit time mentioned above is 120 seconds.

In the AGV system S1 shown in FIG. 9A, each of the power transmitters A1 and A2 uses 20 seconds for transmitting power to each of the AGVs V1 to V4 and thus uses a total of 80 seconds per cycle (120 seconds). Thus, the reference rate of the total transmission period assumed for each of the power transmitters A1 and A2 per unit time (one cycle) is calculated to be 66.7% (≈(80 sec)/120 sec)×100). Therefore, setting the reference rate of 66.7% will prevent the power transmitters A1 and A2 from performing power transmission for an amount of time exceeding the reference rate.

Similarly, each of the AGVs V1 to V4 uses 20 seconds for receiving power from each of the power transmitters A1 and A2 and thus uses a total of 40 seconds per cycle (120 seconds). Thus, the reference rate of the total reception period assumed for each of the AGVs V1 to V4 per unit time (one cycle) is calculated to be 33.3% (≈(40 sec/120 sec)× 100). Therefore, setting the reference rate of 33.3% as the threshold X2 of the receiver usage rate R2 will prevent the AGVs V1 to V4 from performing power reception for an amount of time exceeding the reference rate.

As described above, the AGV system S1 shown in FIG. 9A is configured such that the power transmitters A1 and A2 each stop power transmission when the corresponding usage-rate calculator 133 calculates the transmitter usage rate R1 exceeding 66.7%. Similarly, the AGVs V1 to V4 each stop power reception when the corresponding usage-rate calculator 233 calculates the receiver usage rate R2 exceeding 33.3%.

FIGS. 10A to 10G are views for describing the thresholds X1 and X2 for an AGV system S1 of example 4. The AGV system S1 of this example is similar to the AGV system S1 shown in FIGS. 9A to 9G, except that the traveling time taken for each of the AGVs V1 to V4 to travel from the stop position H1 to the stop position H2 or from the stop position H2 to the stop position H1 is 60 seconds, which is longer than the 40-sec traveling time. FIGS. 10A to 10G correspond to FIGS. 9A to 9G, respectively.

In FIGS. 10B to 10G, the time necessary for one cycle is 160 seconds (=20+60+20+60 seconds), which means that the unit time mentioned above is 160 seconds.

Figure 10A:
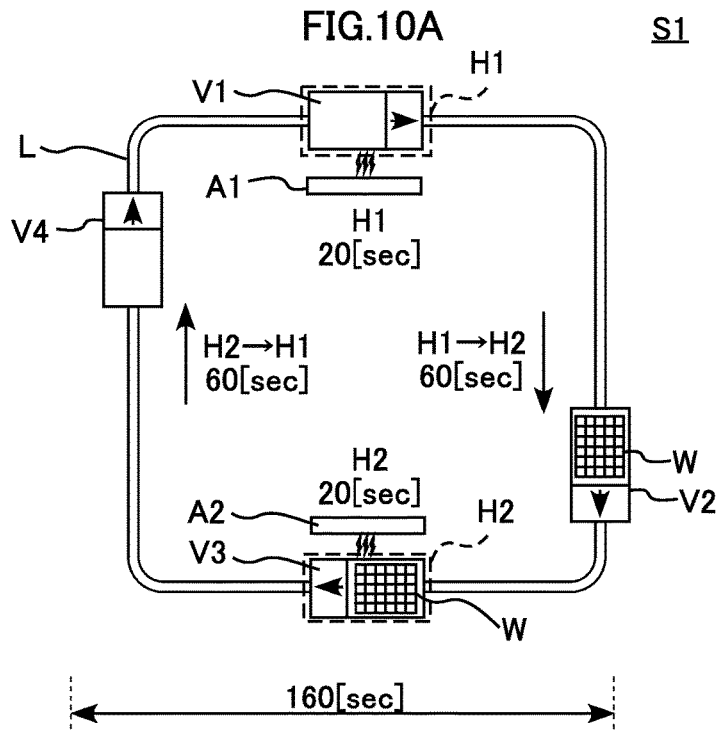
FIG. 10A is a view showing an AGV system of example 4 for describing thresholds of a transmitter usage rate and a receiver usage rate.
Figure 10B:
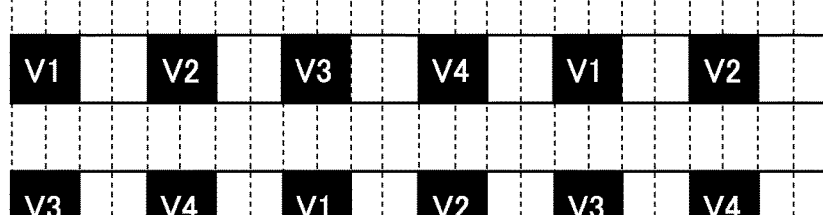
FIGS. 10B to 10G show a chart for describing thresholds of a transmitter usage rate and a receiver usage rate of the AGV system of example 4.
Figure 10C:
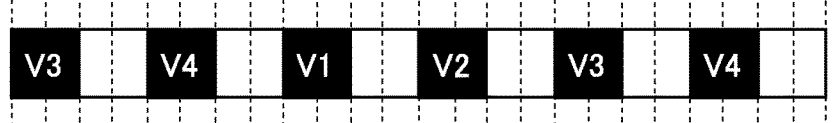
Figure 10D:
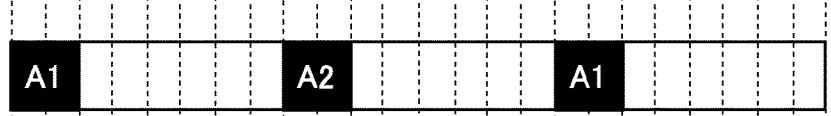
Figure 10E:
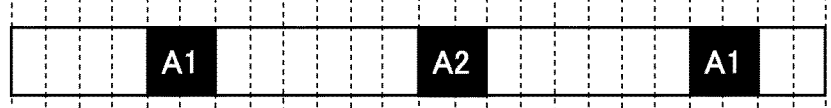
Figure 10F:
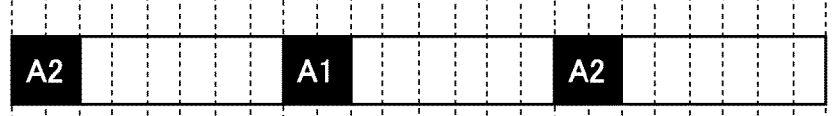
Figure 10G:
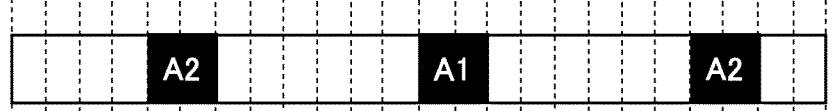

In the AGV system S1 shown in FIG. 10A, each of the power transmitters A1 and A2 uses 20 seconds for transmitting power to each of the AGVs V1 to V4 and thus uses a total of 80 seconds per cycle (160 seconds). Thus, the reference rate of the total transmission period assumed for each of the power transmitters A1 and A2 per unit time (one cycle) is calculated to be 50.0% (=(80 sec/160 sec)×100). Therefore, setting the reference rate of 50.0% as the threshold X1 of the transmitter usage rate R1 will prevent the power transmitters A1 and A2 from performing power transmission for an amount of time exceeding the reference rate.

Similarly, each of the AGVs V1 to V4 uses 20 seconds for receiving power from each of the power transmitters A1 and A2 and thus uses a total of 40 seconds per cycle (160 seconds). Thus, the reference rate of the total reception period assumed for each AGV per unit time (one cycle) is calculated to be 25.0% (=(40 sec/160 sec)×100). Therefore, setting the reference rate of 25.0% as the threshold X2 of the receiver usage rate R2 will prevent the AGVs V1 to V4 from performing power reception for an amount of time exceeding the reference rate.

As described above, the AGV system S1 shown in FIG. 10A is configured such that the power transmitters A1 and A2 each stop power transmission when the corresponding usage-rate calculator 133 calculates the transmitter usage rate R1 exceeding 50.0%. Similarly, the AGVs V1 to V4 each stop power reception when the corresponding usage-rate calculator 233 calculates the receiver usage rate R2 exceeding 25.0%.

FIGS. 11A to 11D are views for describing the thresholds X1 and X2 for an AGV system S1 of example 5. The AGV system S1 of this example includes two power transmitters A1 and A2 and one AGV V1 for one circulation route L. Although FIG. 11A, includes a smaller number of AGVs V than FIG. 7A, FIGS. 11B to 11D are similar to FIGS. 7B and 7E. That is, the stopping time Ts for which the AGV V1 is stopped at each of the stop positions H1 and H2 is 20 seconds. In addition, the traveling time taken for the AGV V1 from the stop position H1 to the stop position H2 or from the stop position H2 to the stop position H1 is 40 seconds.

FIG. 11A shows the overall structure of the AGV system S1 of this example. Similarly to FIG. 7A, FIG. 11A does not show objects W held at the stop positions H1 and H2. FIGS. 11B and 11C show the transition of the respective power transmitters A1 and A2 between the transmission period and the transmission suspension period during normal operation of the AGV system S1 shown in FIG. 11A. In FIGS. 11B and 11C, each transmission period is represented by a solid filled rectangle. To assist the understanding, white letters are shown on each rectangle to indicate that power is transmitted to the AGV V1. FIG. 11D shows the transition of the AGV V1 between the reception period and the reception suspension period during normal operation of the AGV system S1 shown in FIG. 11A. In FIG. 11D, each reception period is represented by a solid filled rectangle. To assist the understanding, white letters are shown on each rectangle to indicate the power transmitter (out of A1 and A2) from which the power is supplied.

FIGS. 11B to 11D are similar to FIGS. 7B to 7E in that the time necessary for one cycle is 120 seconds (=20+40+20+40 seconds), which means that the unit time mentioned above is 120 seconds.

In the AGV system S1 shown in FIG. 11A, each of the power transmitters A1 and A2 uses 20 seconds for transmitting power to the AGV V1 per cycle (120 seconds). Thus, the reference rate of the total transmission period assumed for each of the power transmitters A1 and A2 per unit time (one cycle) is calculated to be 16.7% (≈(20 sec/120 sec)× 100). Therefore, setting the reference rate of 16.7% will prevent the power transmitters A1 and A2 from performing power transmission for an amount of time exceeding the reference rate.

Similarly, the AGV V1 uses 20 seconds for receiving power from each of the power transmitters A1 and A2 and thus uses a total of 40 seconds per cycle (120 seconds). Thus, the reference rate of the total reception period assumed for the AGV V1 per unit time (one cycle) is calculated to be 33.3% (≈(40 sec/120 sec)×100). Therefore, setting the reference rate of 33.3% as the threshold X2 of the receiver usage rate R2 will prevent the AGV V1 from performing power reception for an amount of time exceeding the reference rate.

As described above, the AGV system S1 shown in FIG. 11A is configured such that the power transmitters A1 and A2 each stop power transmission when the corresponding usage-rate calculator 133 calculates the transmitter usage rate R1 exceeding 16.7%. Similarly, the AGV V1 stops power reception when the usage-rate calculator 233 calculates the receiver usage rate R2 exceeding 33.3%.

FIGS. 12A to 12D are views for describing the thresholds X1 and X2 for an AGV system S1 of example 6. The AGV system S1 of this example is similar to the AGV system S1 shown in FIGS. 11A to 11D, except that the traveling time taken for the AGV V1 to travel from the stop position H1 to the stop position H2 or from the stop position H2 to the stop position H1 is 60 seconds, which is longer than the 40-sec traveling time. FIGS. 12A to 12D correspond to FIGS. 11A to 11D, respectively.

In FIGS. 12B to 12D, the time necessary for one cycle is 160 seconds (=20+60+20+60 seconds), which means that the unit time mentioned above is 160 seconds.

In the AGV system S1 shown in FIG. 12A, each of the power transmitters A1 and A2 uses 20 seconds for transmitting power to the AGV V1 per cycle (160 seconds). Thus, the reference rate of the total transmission period assumed for each of the power transmitters A1 and A2 per unit time (one cycle) is calculated to be 12.5% (=(20 sec/160 sec)×100). Therefore, setting the reference rate of 12.5% as the threshold X1 of the transmitter usage rate R1 will prevent the power transmitters A1 and A2 from performing power transmission for an amount of time exceeding the reference rate.

Similarly, the AGV V1 uses 20 seconds for receiving power from each of the power transmitters A1 and A2 and thus uses a total of 40 seconds per cycle (160 seconds). Thus, the reference rate of the total reception period assumed for the AGV V1 per unit time (one cycle) is calculated to be 25.0% (=(40 sec/160 sec)×100). Therefore, setting the reference rate of 25.0% as the threshold X2 of the receiver usage rate R2 will prevent the AGV V1 from performing power reception for an amount of time exceeding the reference rate.

As described above, the AGV system S1 shown in FIG. 12A is configured such that the power transmitters A1 and A2 each stop power transmission when the corresponding usage-rate calculator 133 calculates the transmitter usage rate R1 exceeding 12.5%. Similarly, the AGV V1 stops power reception when the usage-rate calculator 233 calculates the receiver usage rate R2 exceeding 25.0%.

Comparison among FIGS. 7A, 9A, and 11A or among FIGS. 8A, 10A, and 12A indicates that the numbers of power transmitters A and of AGVs V (power receivers B) provided for one circulation route L affect the magnitude relation between the thresholds X1 and X2. Specifically, in a case where an equal number of power transmitters A and of AGVs V are provided for one circulation route L (as in FIG. 7A or 8A), the thresholds X1 and X2 are set to the same value. In a case where a smaller number of power transmitters A than AGVs V are provided for one circulation route L (as in FIG. 9A or 10A), the threshold X1 for the power transmitters A is set to a greater value than the threshold X2 for the AGVs V. Conversely, in a case where a greater number of power transmitters A than AGVs V are provided for one circulation route L (as in FIG. 11A or 12A), the threshold X1 for the power transmitters A is set to a smaller value than the threshold X2 for the AGVs V.

Also, comparison between FIGS. 7A and 8A, between FIGS. 9A and 10A, or between 11A and 12A indicates that the total traveling time with respect to the time needed for one cycle affects the values of the thresholds X1 and X2. Specifically, the threshold X1 set for the power transmitters A and the threshold X2 set for the AGVs V are increasingly larger as the traveling time between the stop positions H is shorter (i.e., as the stopping time Ts at each stop position H is longer) relative to the time needed for one cycle. Conversely, the threshold X1 set for each power transmitter A and the threshold X2 set for each AGV V are increasingly smaller as the traveling time between each two stop positions H is longer (i.e., as the stopping time Ts at each stop position H is shorter) relative to the time needed for one cycle.

As clarified above, the thresholds X1 and X2 of the power transmitters A and AGVs V (power receivers B) are determined in accordance with the intended structure of the AGE system S1. In the examples shown in FIGS. 7A, 8A, 9A, 10A, 11A and 12A, the time at which each AGV V arrives at a stop position H is designated as a starting point (i.e., 0 second), and the usage rates of the power transmitter A and power receiver B are calculated based on the usages expected to occur during one unit time from the starting point. Alternatively, the usage rates may be calculated using a different starting point. Since the resulting values will be the same regardless of which starting point is used, any starting point may be used to calculate the usage rates to determine the thresholds X1 and X2. In the examples described above, the stop positions H are located such that the traveling times (distances) between two subsequent stop positions H on the circulation route L are all equal. In some examples, however, the traveling times (distances) between two subsequent stop positions H may be different from one another. In such examples, the thresholds X1 and X2 may still be calculated in the same manner as described above.

Each power transmitter A of the present embodiment is configured to measure a transmission period, calculate a transmitter usage rate R1 based on the transmission period, and suspend power transmission when the transmitter usage rate R1 exceeds the threshold X1 set in advance. This configuration is effective to avoid excessive use of the power transmitter A and thus to prevent failure of components mounted on the power transmitter A. For example, in a case where an AGV V is parked at a stop position H longer than the predetermined stopping time, the power transmitter A performs power transmission for a prolonged period of time. Since such a prolonged transmission period results in the transmitter usage rate R1 exceeding the threshold X1, the power transmitter A automatically stops transmitting high-frequency power. In this way, excessive use of the power transmitter A is avoided.

Each AGV V (power receiver B) of the present embodiment is configured to measure a reception period, calculates a receiver usage rate R2 based on the reception period, and suspends power reception when the receiver usage rate R2 exceeds the threshold X2 set in advance. This configuration is effective to avoid excessive use of the AGV V (power receiver B) and thus to prevent failure of components mounted on the AGV V (power receiver B). For example, in a case where an AGV V is parked at a stop position H longer than the predetermined stopping time, the AGV V undergoes power reception for a prolonged period of time. Since such a prolonged reception period results in the receiver usage rate R2 exceeding the threshold X2, the AGV V (power receiver B) automatically operates to stop receiving power from the power transmitter A. In this way, excessive use of the AGV V is avoided.

Each AGV V (power receiver B) included in the AGV system S1 of the present embodiment is configured to place the switch 222 to the open state in response to the receiver usage rate R2 exceeding the threshold X2. This causes the reflected power Pr to increase abruptly and reach the pre-determined threshold. In response to the reflected power Pr reaching the threshold, the power transmitter A stops power transmission, so that the AGV V (power receiver B) stops power reception. That is, the AGV V (power receiver B) manages to notify the power transmitter A that power transmission is requested to be stopped, without using a communication function. In this way, the power transmitter A stops receiving high-frequency power.

Each power transmitter A of the present embodiment is configured such that the usage-rate calculator 133 calculates the transmitter usage rate R based on the power supply history reflecting data measured in the most recent period corresponding to one unit from the current time. That is, the power transmitter A determines whether to stop power transmission based on the transmitter usage rate R1 calculated for the most recent period corresponding to one unit time. This enables the power transmitter A to stop power transmission immediately upon the transmitter usage rate R1 reaching the threshold X1. In addition, the usage-rate calculator 233 of the AGV V (power transmitter B) is configured to calculate the receiver usage rate R2 based on the power reception history reflecting data measured in the most recent period corresponding to one unit time from the current time. That is, the AGV V (power receiver B) determines whether to stop power reception based on the receiver usage rate R2 calculated for the most recent period corresponding to one unit time. This enables the AGV V (power receiver B) to stop power reception immediately upon receiver usage rate R2 reaching the threshold X2.

Figure 13:
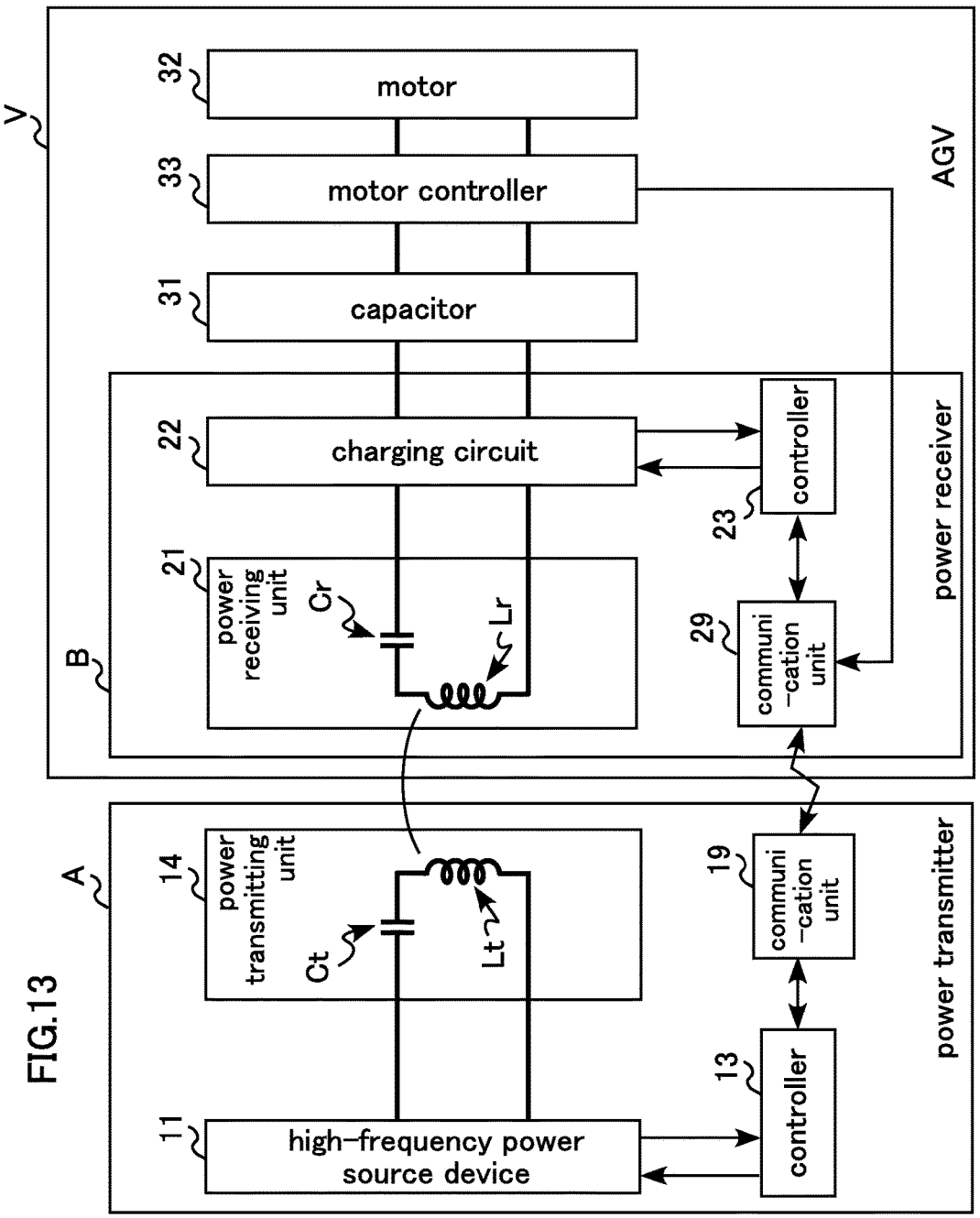
FIG. 13 is a block diagram showing an example of the overall structure of an AGV system according to a second embodiment of the present disclosure.

FIG. 13 is a block diagram showing an AGV system S2 according to a second embodiment of the present disclosure. In FIG. 13, the same or similar components to those of the first embodiment are denoted by the same reference signs and no further description of such components is given. In contrast to the AGV system S1 of the first embodiment, the AGV system S2 is capable of wireless communications between a power transmitter A and an AGV V.

The power transmitter A additionally includes a communication unit 19 to implement the communication function of the power transmitter A. The communication unit 19 receives and transmits signals to and from the AGV V.

Also, the AGV V (power receiver B) additionally includes a communication unit 29 to implement the communication function of the AGV V. The communication unit 29 receives and transmits signals to and from power transmitters A.

The AGV V of the present embodiment is configured to issue by the communication unit 29 a vehicle-stop signal to the power transmitter A when the AGV V comes to stop at a stop position H. The power transmitter A receives by the communication unit 19 the vehicle-stop signal and starts to transmit electric power. Specifically, upon deactivation of the motor 32, the motor controller 33 informs the communication unit 29 about the deactivation. In response, the communication unit 29 issues a vehicle-stop signal to the power transmitter A. The communication unit 19 receives the vehicle-stop signal and passes the signal to the controller 13. In response, the controller 13 issues a high-frequency power control signal $S_{INV}$ to the inverter circuit 112. Through the above process, the power transmitter A starts to transmit electric power. That is, the power transmitter A in the AGV system S2 is not provided with a vehicle-stop detector 12 and uses wireless communication to determine whether there is an AGV V stopped and whether to start power transmission.

The AGV V of the present embodiment is configured to issue by the communication unit 29 a power-stop command to the power transmitter A in response to the receiver usage rate R2 exceeding the threshold X2. The power transmitter A receives the power-stop command and stops the power transmission. Specifically, the controller 23 issues a power-stop command to the communication unit 29 in response to the receiver usage rate R2 exceeding the threshold X2. The communication unit 29 transmits the power-stop command to the power transmitter A. The communication unit 19 receives the power-stop command and passes the command to the controller 13. In response, the controller 13 issues a high-frequency power control signal $S_{INV}$ to the inverter circuit 112. In this way, the power transmitter A stops power transmission and thus the power receiver B stops power reception. As described above, when the receiver usage rate R2 exceeds the threshold X2, the AGV V uses wireless communications to notify the power transmitter A that power transmission is requested to be stopped. By causing the power transmitter A to stop the power transmission in this way, the power receiver B stops receiving power. The AGV V of the present embodiment is not required to cause an abrupt increase in the reflected power Pr for notification of a request to stop power transmission. Therefore, the switch 222 and the switch controller 234 used in the first embodiment may be omitted.

The AGV system S2 according to the second embodiment provides the same advantages as those provided by the AGV system S1 of the first embodiment.

Although the unit time of the power transmitters A and the AGVs V in the first and second embodiments is equal to the time necessary for one cycle of the AGV system S1 (S2), the unit time is not limited to such and may be set to any appropriate time period. However, in a case where the unit time is set to a time period instead of one cycle time, the thresholds X1 and X2 to be calculated may differ depending on the state of the AGV system S1 (S2) designated as the starting point of a time period subjected to the calculation of the usage rates of the power transmitters A and the power receivers B. The details are described below.

Suppose that the AGV system S1 shown in FIG. 7A have a unit time of 140 seconds, which is a time period determined as desired. Note that the stopping time Ts at each stop position H and the traveling time along the route L are the same as those in the AGV system S1 shown in FIG. 7A. With respect to such an AGV system S1, first, consider the case where the time at which the AGV V1 arrives at the stop position H1 is designated as the starting point. Then, the power transmitter A1 is assumed to use 60 seconds for power transmission during 140 seconds. Thus, the reference rate of the power transmitter A1 is calculated to be 42.9% ($\approx$(60 sec/140 sec×100) (see FIG. 14A). Next, consider the case where 10 seconds after the arrival of the AGV V1 at the stop position H1 is designated as the starting point. Then, power transmitter A1 is assumed to use 50 seconds for power transmission during 140 seconds. Thus, the usage rate of the power transmitter A1 is calculated to be 35.7% ($\approx$(50 sec/140 sec×100) (see FIG. 14B). Next, consider the case where 20 seconds after the arrival of the AGV V1 at the stop position H1 is designated as the starting point. Then, the power transmitter A1 is assumed to use 40 seconds for power transmission during 140 seconds. Thus, the usage rate of the power transmitter A1 is calculated to be 28.6% (≈(450 sec/140 sec×100) (see FIG. 14C).

As shown above, in a case where the unit time is determined as desired, different reference rates may be calculated depending on the traveling state of the AGV V1 designated as the staring time. In this case, the highest one of the reference rates may be set as the threshold X1 as it represents the longest use of the AGV V1. Although the description given above with reference to FIGS. 14A to 14c is relevant to the threshold X1 of the power transmitter A1, the same description basically applies to the threshold X1 of the power transmitter A2, and also to the threshold X2 of the AGVs V1 and V2. Therefore, no further description is given. In addition, the description given above is based on an AGV system S1 similar to that shown in FIG. 7A, the same holds with respect to the AGV systems shown in FIGS. 8A, 9A, 10A, 11A and 12A.

As described above, the unit time determined to have a desired length may result in different reference rates depending on the state of the AGV system S1 (S2) designated as the starting time designated. In contrast, the unit time determined to correspond to the time of one cycle results in the same usage rate regardless of the starting time designated. Naturally, the unit time correspond to the time of one cycle is more convenient in calculating the thresholds X1 and X2.

In the first and second embodiments, the threshold X1 of the transmitter usage rate R1 is stored in advance in the controller 13, and the threshold X2 of the receiver usage rate R2 in the controller 23. However, this is only an example and not limited thereto. In one alternative, the thresholds X1 and X2 may be automatically calculated respectively by the controllers 13 and 23 based on information input thereto. Such information may include the numbers of the power transmitters A and the AGVs V provided to one circulation route L, the stopping time Ts at each stop position H, and the traveling time of each AGV V between stop positions H.

In the first and second embodiments, the timer 132 measures the transmission period based on the forward power Pf received from the power detector 113. However, the scheme for the timer 132 to measure the transmission period is not limited to the one described above. In one alternative, the transmission period may be measured based on the reflected power Pr received from the power detector 113. In another alternative, the transmission period may be measured based on the assumption that the duration of the high-frequency power control signal $S_{INV}$ issued from the power transmission controller 134 to the inverter circuit 112 is substantially equal to the duration of power transmission. In a yet another alternative, a current or voltage detector may be connected between the inverter circuit 112 and the power transmitting unit 14. Then, the transmission period may be measured based on the current or voltage detected by the current or voltage detector. Any structure enabling the timer 132 to measure the transmission period is applicable.

In the first and second embodiments, the timer 232 measures the reception period based on the charge voltage received from the voltage detector 223. However, the scheme for the timer 232 to measure the reception period is not limited to the one described above. In one alternative, the voltage detector 223 may be replaced with a current detector. Then, the reception period may be measured based on the current value received from the current detector. Specifically, the presence of electric current detected by the current detector is assumed indicate that electric power is being received and the absence of electric current is assumed to indicate that electric power is not being received. Such a current detector may be connected anywhere between the power receiving unit 21 and the capacitor 31. Any structure enabling the timer 232 to measure the reception period is applicable.

In the first and second embodiments, the usage-rate calculator 133 calculates the transmitter usage rate R1 based on the power supply history reflecting data measured in a period of one unit from the current time. However, the scheme for the usage-rate calculator 133 to calculate the transmitter usage rate R1 is not limited to the one described above. In one alternative, the transmitter usage rate R1 of the power transmitter A may be calculated based on the total transmission period relative to the total operating time of the power transmitter A. For this purpose, the timer 132 that measures the transmission period additionally measures the operating time staring upon the activation of the power transmitter A. Then, the usage-rate calculator 133 can calculate the rate of the transmission period relative to the operating time ((total transmission period/operating time)×100). Similarly, the usage-rate calculator 233 may calculate the receiver usage rate R2 using a different scheme than calculating it based on the power supply history reflecting data measured in a period of one unit from the current time. In one alternative, the receiver usage rate R2 of the power receiver B may be calculated based on the total reception period relative to the total operating time of the power receiver B. For this purpose, the timer 232 that measures reception period additionally measures the operating time staring upon the activation of the power receiver B. Then, the usage-rate calculator 233 can calculate the rate of the reception period relative to the operating time ((total reception period/operating time)×100). Note that the operating time is equal to the unit time.

In the first and second embodiments, the AGV system S1 (S2) includes, but not limited to, one or more AGVs V. The AGVs V may be replaced with automated guided forklifts, tool trolleys, or turret trucks. In addition, the AGVs are not limited those for transporting objects W and may be for transporting people. The wireless charging system of the present disclosure is applicable to charge any of such electric vehicles that travel along a predetermined circulation path using electricity stored in a capacitor or secondary battery.

Although the power transmitters, power receivers and wireless charging systems of the specific embodiments have been described, the present disclosure is not limited to the embodiments and the modifications described above. Various design modifications may be made to the specific structures of each component without departing from the scope of the claims of the present disclosure.

The following clauses are added to the foregoing embodiments.

Clause 1. A power transmitter comprising:
  a high-frequency power source device (11) generating high-frequency power;
  a power transmitting unit (14) including a power-transmitting coil (Lt), the power transmitting unit wirelessly transmitting the high-frequency power received from the high-frequency power source device to a power receiver (B) mounted on an electric vehicle; and
  a transmitter-side controller (13) that calculates a transmitter usage rate, the transmitter-side controller causing the power transmitting unit to stop power transmission in response to the transmitter usage rate exceeding a predetermined threshold, the transmitter usage rate indicating a rate of time during which the power transmitting unit transmits power to the power receiver per unit time.

Clause 2. The power transmitter according to clause 1, wherein the transmitter-side controller:
includes a transmitter-side timer that measures a transmission period during which the power transmitting unit performs a power transmission process;
calculates a total transmission period by summing transmission periods measured by the transmitter-side timer in a past period of one unit time from a current time; and
calculates the transmitter usage rate based on the total transmission period and the unit time.

Clause 3. A power receiver (B) comprising:
a power receiving unit (21) including a power-receiving coil (Lr), the power receiving unit wirelessly receiving high-frequency power transmitted from a power transmitter (A);
a charging circuit (22) that converts the high-frequency power received by the power receiving unit into a converted power having a predetermined electrical characteristic, the charging circuit supplying the converted power to a power storage device to charge the power storage device; and
a receiver-side controller (23) that calculates a receiver usage rate, the receiver-side controller causing the power receiving unit to stop power reception in response to the receiver usage rate exceeding a predetermined threshold, the receiver usage rate indicating a rate of time during which the power receiving unit receives power from the power transmitter per unit time.

Clause 4. The power receiver according to clause 3, wherein the receiver-side controller:
includes a receiver-side timer that measures a reception period during which the power receiving unit performs a power reception process;
calculates a total reception period by summing reception periods measured by the receiver-side timer in a past period of one unit time from a current time; and
calculates the receiver usage rate from the total reception period and the unit time.

Clause 5. A wireless charging system comprising:
at least one power transmitter (A) according to claim 1; and
at least one power receiver (B),
wherein the power receiver includes:
a power receiving unit (21) including a power-receiving coil (Lr), the power receiving unit wirelessly receiving high-frequency power transmitted from the power transmitter;
a charging circuit (22) that converts the high-frequency power received by the power receiving unit into a converted power having a predetermined electrical characteristic, the charging circuit supplying the converted power to a power storage device to charge the power storage device; and
a receiver-side controller (23) that calculates a receiver usage rate, the receiver-side controller causing the power receiving unit to stop power reception in response to the receiver usage rate exceeding a predetermined threshold, the receiver usage rate indicating a rate of time during which the power receiving unit receives power from the power transmitter per unit time.

Clause 6. The wireless charging system according to clause 5, wherein in response to the receiver usage rate exceeding the threshold, the receiver-side controller transmits a notification to the power transmitter, and
in response to the transmitter-side controller receiving the notification, the transmitter-side controller stops power transmission so that the power receiving unit stops receiving power.

Clause 7. The wireless charging system according to clause 6,
wherein the power receiver includes a switch operated to connect and disconnect the power supply to the power storage device,
wherein the power transmitter includes a power detector (113) that detects a reflected power at an output end of the high-frequency power source device,
wherein in response to the receiver usage rate exceeding the threshold, the receiver-side controller operates the switch to disconnect the power supply to the power storage device so as to cause the reflected power to increase, and
wherein the transmitter-side controller stops power transmission based on the reflected power detected by the power detector.

Clause 8. The wireless charging system according to any one of clauses 5 to 7, wherein in response to the transmitter usage rate exceeding the threshold, the transmitter-side controller causes power transmission to be stopped by causing the high-frequency power source device to stop generating high-frequency power.

Clause 9. The wireless charging system according to any one of clauses 5 to 8, wherein the number of the at least one power transmitter installed along a route (L) is not equal to the number of the at least one power receiver each mounted on electric vehicles traveling along the route, and the threshold determined for the transmitter usage rate differs from the threshold determined for the receiver usage rate.

Clause 10. The wireless charging system according to any one of clauses 5 to 9, wherein the unit time of the power transmitters and the unit time of the power receivers are both determined by a sum of a travel time taken for the electric vehicles to travel one lap of the route and a stopping time for which the electric vehicles stop during the travel.

The invention claimed is:
1. A power transmitter comprising:
a high-frequency power source device generating high-frequency power;
a power transmitting unit including a power-transmitting coil, the power transmitting unit wirelessly transmitting the high-frequency power received from the high-frequency power source device to a power receiver mounted on an electric vehicle; and
a transmitter-side controller that calculates a transmitter usage rate, the transmitter-side controller causing the power transmitting unit to stop power transmission in response to the transmitter usage rate exceeding a predetermined threshold, the transmitter usage rate indicating a rate of time during which the power transmitting unit transmits power to the power receiver per unit time.

2. The power transmitter according to claim 1, wherein the transmitter-side controller:
includes a transmitter-side timer that measures a transmission period during which the power transmitting unit performs a power transmission process;

calculates a total transmission period by summing transmission periods measured by the transmitter-side timer in a past period of one unit time from a current time; and calculates the transmitter usage rate based on the total transmission period and the unit time.

3. A power receiver comprising:

a power receiving unit including a power-receiving coil, the power receiving unit wirelessly receiving high-frequency power transmitted from a power transmitter;

a charging circuit that converts the high-frequency power received by the power receiving unit into a converted power having a predetermined electrical characteristic, the charging circuit supplying the converted power to a power storage device to charge the power storage device; and a receiver-side controller that calculates a receiver usage rate, the receiver-side controller causing the power receiving unit to stop power reception in response to the receiver usage rate exceeding a predetermined threshold, the receiver usage rate indicating a rate of time during which the power receiving unit receives power from the power transmitter per unit time.

4. The power receiver according to claim 3, wherein the receiver-side controller:

includes a receiver-side timer that measures a reception period during which the power receiving unit performs a power reception process;

calculates a total reception period by summing reception periods measured by the receiver-side timer in a past period of one unit time from a current time; and calculates the receiver usage rate from the total reception period and the unit time.

5. A wireless charging system comprising:

at least one power transmitter according to claim 1; and at least one power receiver, wherein the power receiver includes:
 a power receiving unit including a power-receiving coil, the power receiving unit wirelessly receiving high-frequency power transmitted from the power transmitter;
 a charging circuit that converts the high-frequency power received by the power receiving unit into a converted power having a predetermined electrical characteristic, the charging circuit supplying the converted power to a power storage device to charge the power storage device; and
 a receiver-side controller that calculates a receiver usage rate, the receiver-side controller causing the power receiving unit to stop power reception in response to the receiver usage rate exceeding a predetermined threshold, the receiver usage rate indicating a rate of time during which the power receiving unit receives power from the power transmitter per unit time.

6. The wireless charging system according to claim 5, wherein in response to the receiver usage rate exceeding the threshold, the receiver-side controller transmits a notification to the power transmitter, and in response to the transmitter-side controller receiving the notification, the transmitter-side controller stops power transmission so that the power receiving unit stops receiving power.

7. The wireless charging system according to claim 6, wherein the power receiver includes a switch operated to connect and disconnect the power supply to the power storage device, wherein the power transmitter includes a power detector that detects a reflected power at an output end of the high-frequency power source device, wherein in response to the receiver usage rate exceeding the threshold, the receiver-side controller operates the switch to disconnect the power supply to the power storage device so as to cause the reflected power to increase, and wherein the transmitter-side controller stops power transmission based on the reflected power detected by the power detector.

8. The wireless charging system according to claim 5, wherein in response to the transmitter usage rate exceeding the threshold, the transmitter-side controller causes power transmission to be stopped by causing the high-frequency power source device to stop generating high-frequency power.

9. The wireless charging system according to claim 5, wherein the number of the at least one power transmitter installed along a route is not equal to the number of the at least one power receiver each mounted on the electric vehicle traveling along the route, and the threshold determined for the transmitter usage rate differs from the threshold determined for the receiver usage rate.

10. The wireless charging system according to claim 5, wherein the unit time of the power transmitters and the unit time of the power receivers are both determined by a sum of a travel time taken for the electric vehicle to travel one lap of the route and a stopping time for which the electric vehicle stops during the travel.

* * * * *